Nov. 13, 1945.　　　R. C. ELLIOTT ET AL　　　2,388,961

PHOTO-MECHANICAL TYPOGRAPHICAL COMPOSING MACHINE

Filed Oct. 1, 1943　　　10 Sheets-Sheet 1

INVENTORS
Maurice Richard Dewhurst.
Richard Cornelius Elliott.
Joseph Bourdas Smith Booth.

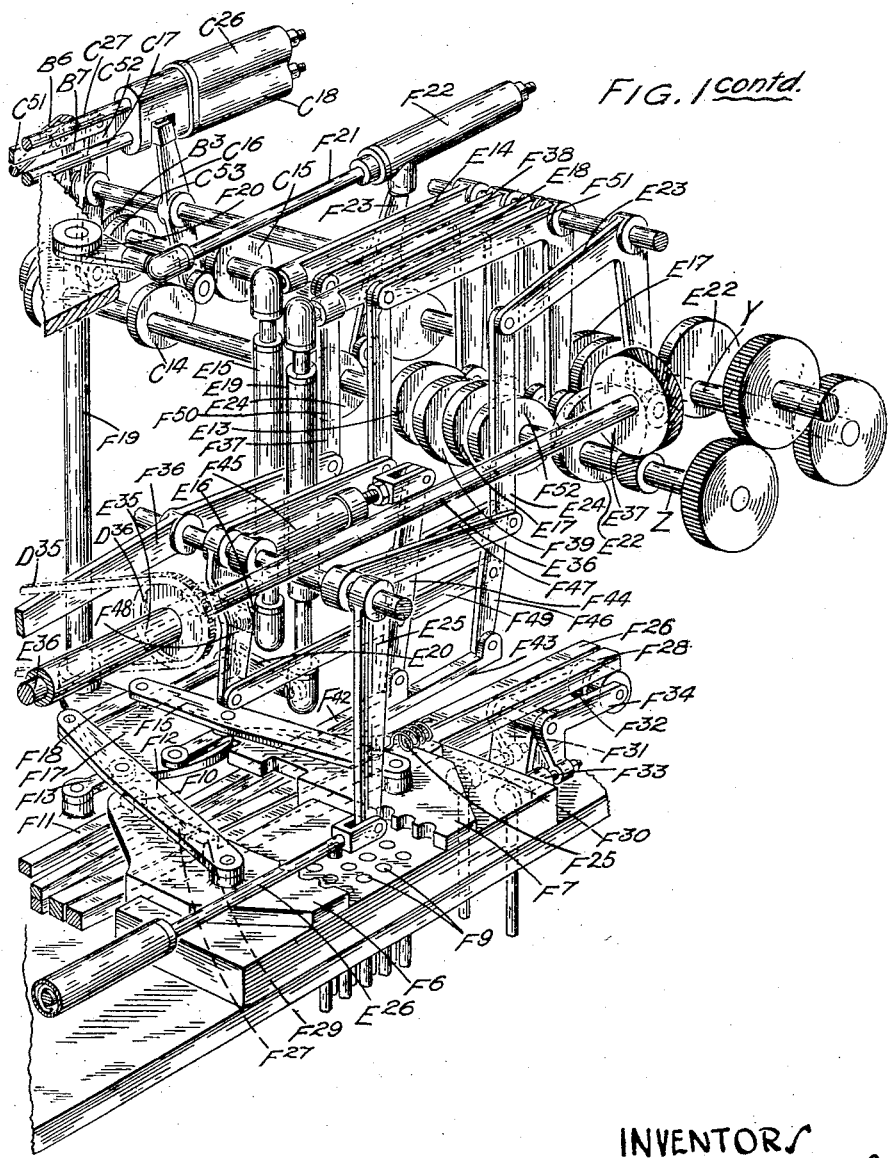

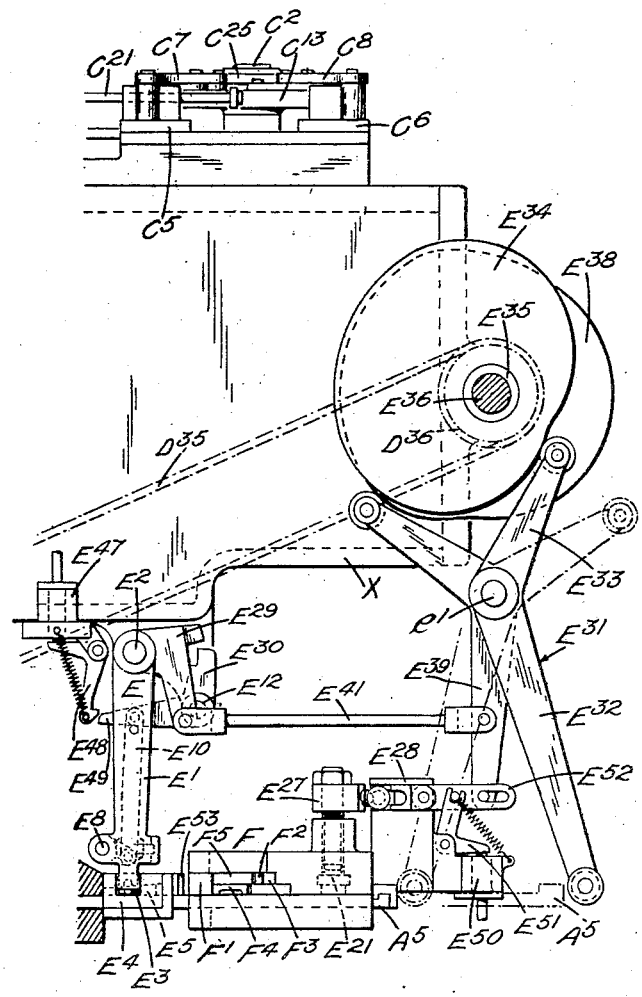

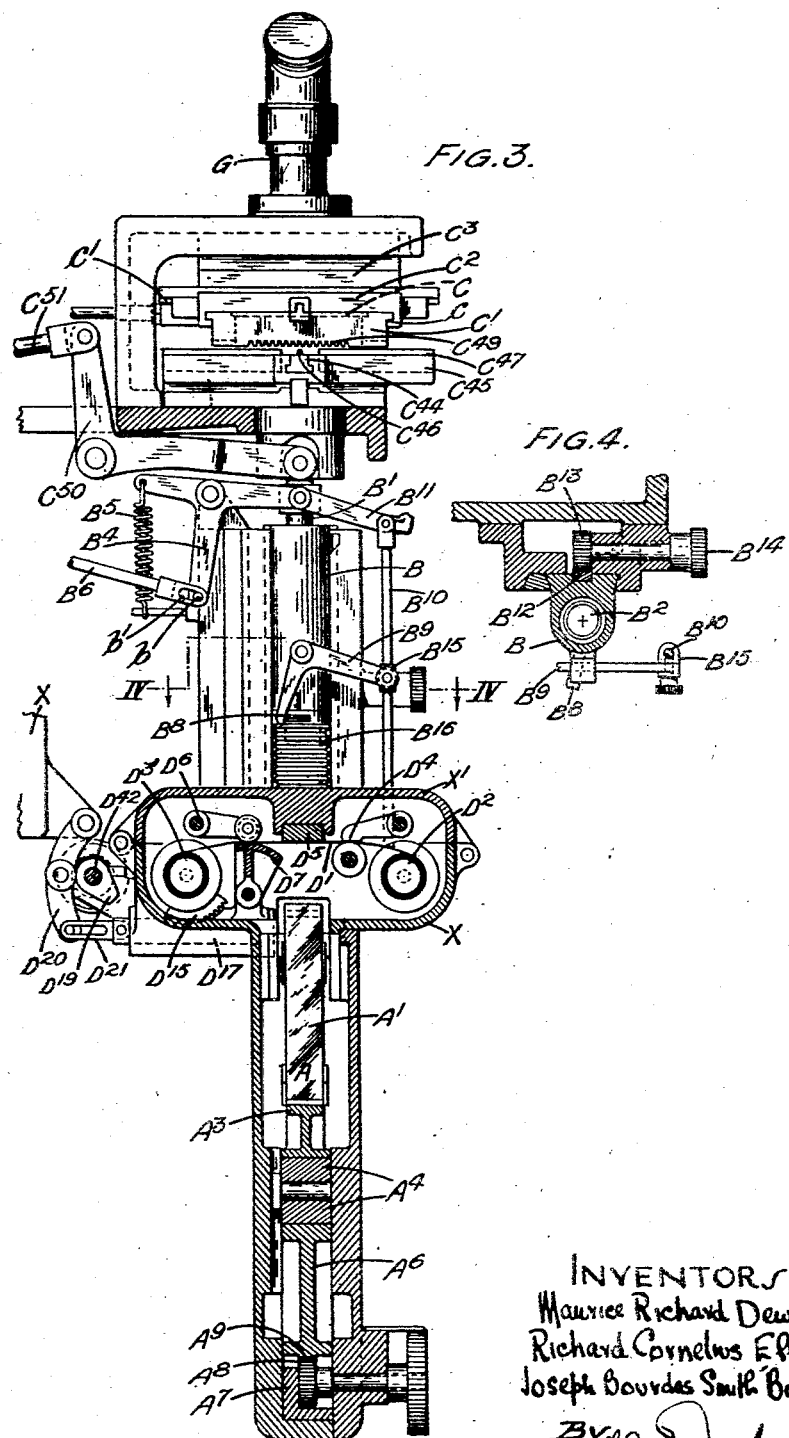

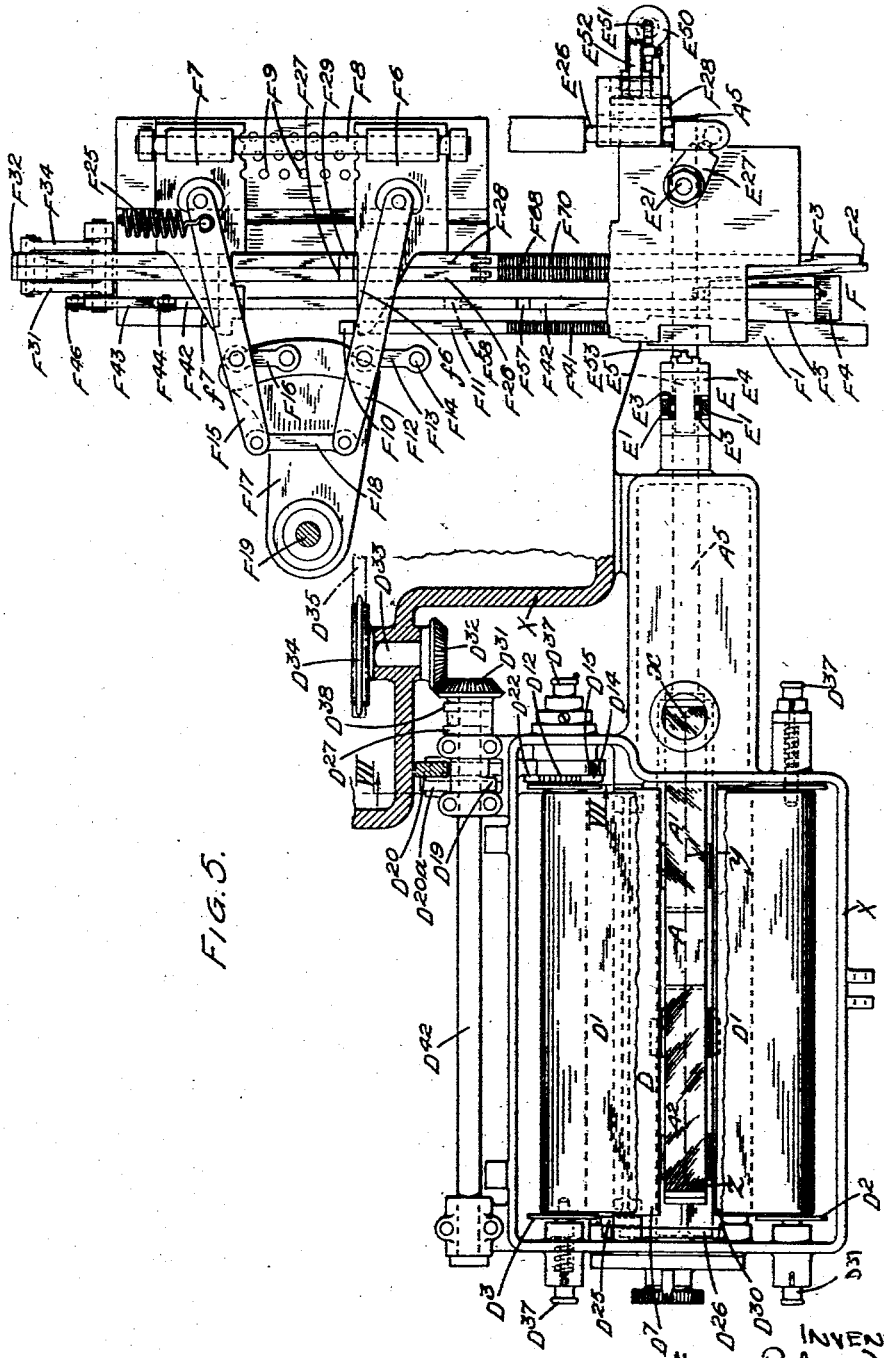

Nov. 13, 1945.    R. C. ELLIOTT ET AL    2,388,961
PHOTO-MECHANICAL TYPOGRAPHICAL COMPOSING MACHINE
Filed Oct. 1, 1943    10 Sheets-Sheet 7
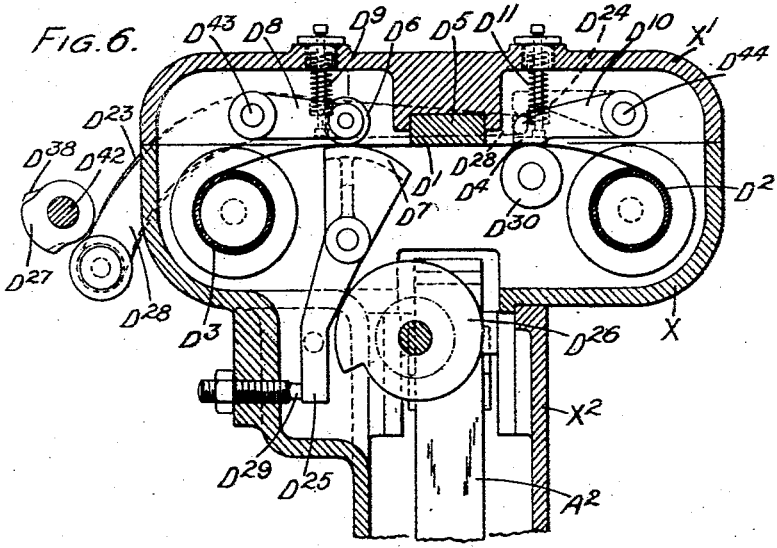
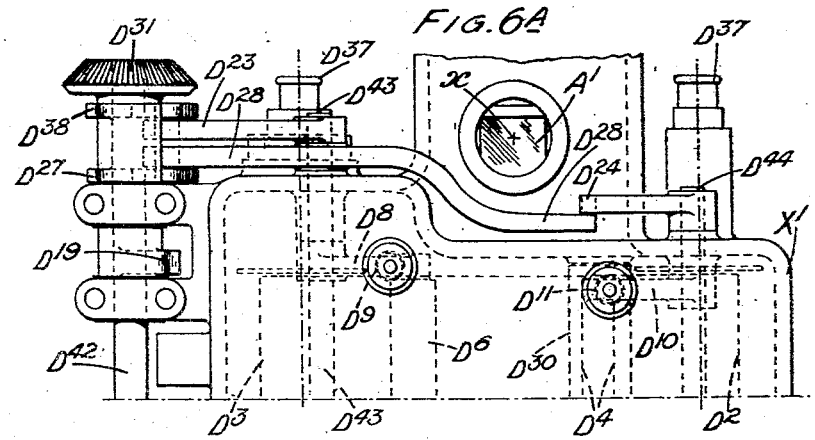
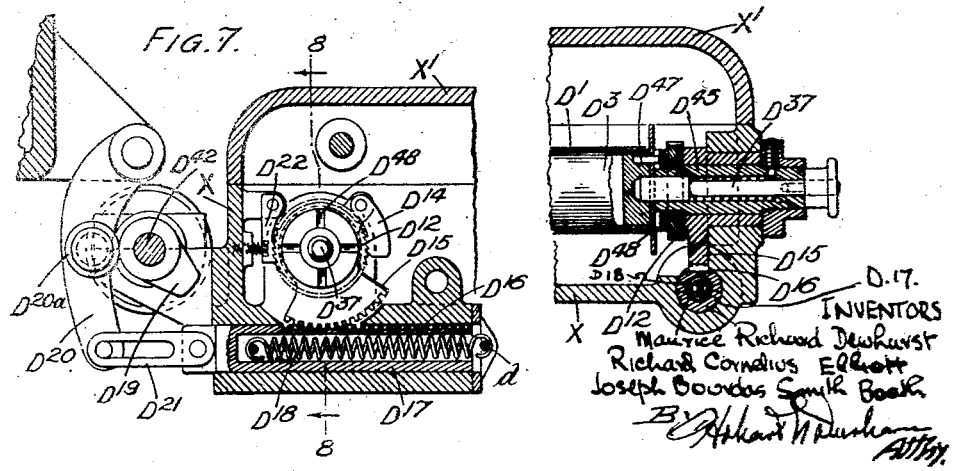

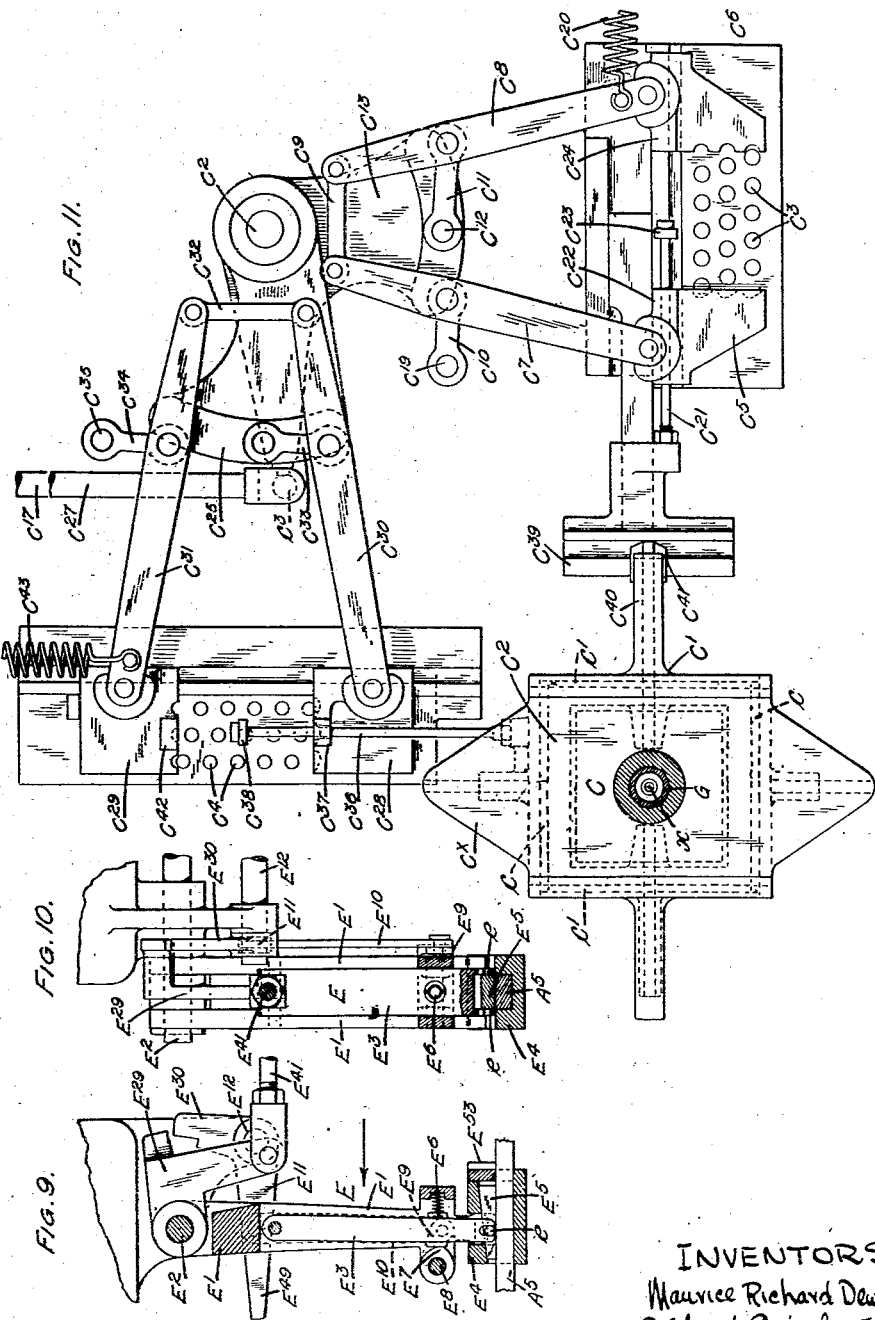

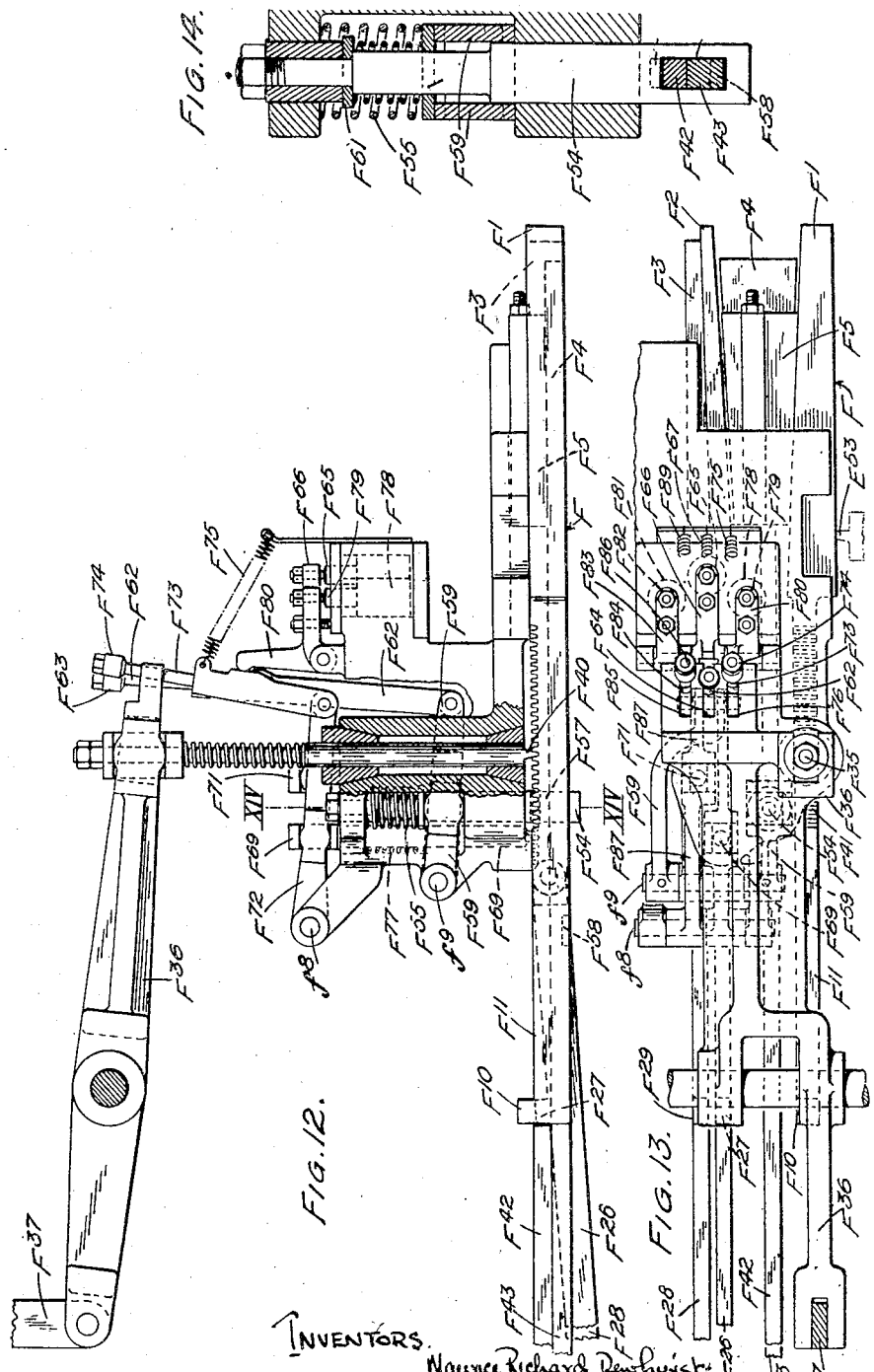

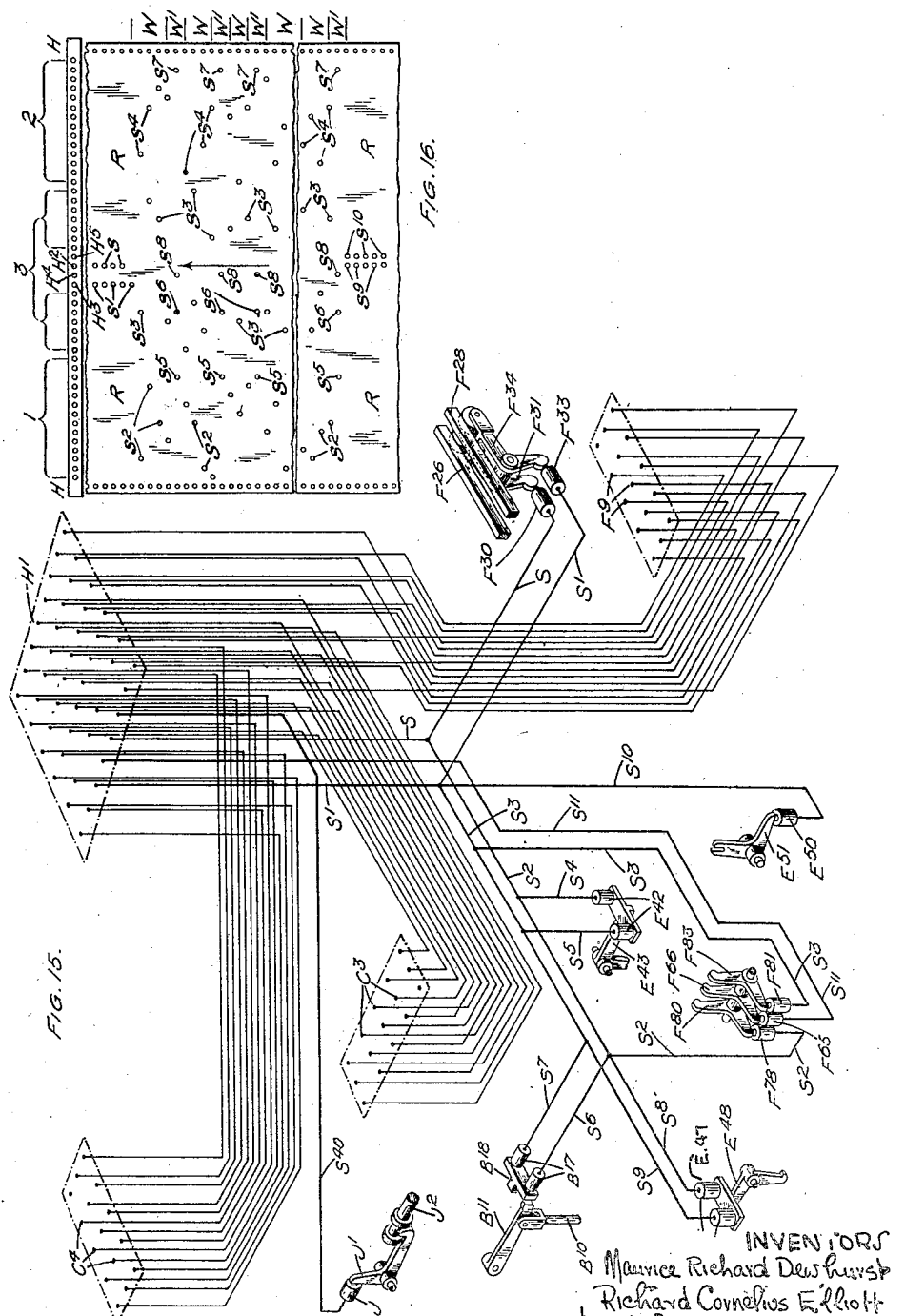

Patented Nov. 13, 1945

2,388,961

UNITED STATES PATENT OFFICE 2,388,961

PHOTOMECHANICAL TYPOGRAPHICAL COMPOSING MACHINE

Richard Cornelius Elliott, Redhill, Maurice Richard Dewhurst, Coulsdon, and Joseph Bourdas Smith Booth, Redhill, England, assignors to The Monotype Corporation Limited, Redhill, England, a British corporation Application October 1, 1943, Serial No. 504,576
In Great Britain April 16, 1943

20 Claims. (Cl. 95—4.5)

This invention relates to photo-mechanical typographical composing machines of the kind wherein single characters and other typographical symbols or images can be projected in succession, by photographic means, from masters or originals, through a lens and on to a sensitised or light-sensitive surface or element, to form thereon composed and justified lines of text or letterpress.

More particularly the invention refers to machines of the kind referred to, in which the movements of co-operating elements or units are governed by a pre-prepared pattern, controller, record strip or other element which represents a preliminary setting of the composition.

In such machines, characters, images and other symbols pertaining to a typographical fount or lay-out, are conveniently arranged on a single master plate or sheet, by any method which will render them suitable for projection by light. This master plate can be mounted in supports and be adjustable so that any character or image thereon may be selectively positioned in alignment with a lens or lens system for projection on to, and photographing upon, the sensitised or light-sensitive surface or element.

In some of the hitherto proposed machines, the sensitised surface or element, on which composition is to be made, is in the form of a sheet or page, which is moved sidewise for each character or the like in a line and the extent of each movement is generally varied in accordance with the width of the character or the like projected or to be projected. After the completion of a line of composition, the sheet or page is moved lengthwise or at right-angles to the movement above referred to, to present a fresh portion thereof for a succeeding line of composition. In other machines, the sensitised element is in the form of a narrow ribbon or strip and the lines of text matter are composed end to end thereon. Such ribbon or strip is advanced intermittently for each character or the like in a line, and on the completion of a line of composition, the strip or ribbon is advanced a sufficient distance to provide for marginal spaces between successive lines and to position the strip for the commencement of a fresh line of composition, as in the case of a sheet or page. The lines of text on this ribbon or strip are thereafter photographed on to a page sheet by passing the said strip line by line through a second machine wherein the sensitised page sheet or element is mounted.

The photographed impression or matter on the sensitised surface of a page or sheet element produced by either of these two methods can be transferred by any known processes, to a plate or cylinder of a lithographic or other press or machine from which printed ink copies on paper can be obtained in any known manner.

It is essential that the ultimate printed copies produced possess all the refinements and accuracies existing with prints obtained from hand-set or machine-set metal types; such refinements consisting chiefly in accuracy of alignment, of spaces between characters and words, and also equality of definition and colour of the characters through a piece of composition.

In hitherto proposed machines wherein the characters or the like are photographically impressed from masters or originals on to a sensitised sheet or page which is advanced intermittently for successive impressions, the said page or sheet, together with feed mechanisms, are enclosed in a light-excluding box or casing, which carries the necessary operating mechanism, and, as this casing and the operating mechanism have to be moved bodily for each character or like exposure, a considerable and undesirable load is placed on the machine, which since the machine should be capable of effecting from say not less than 150 exposures per minute, mitigates against accuracy and reliability, and the quality of the product.

Likewise when the sensitised element is in the form of a narrow ribbon or strip, and this is advanced intermittently for successive exposures somewhat complicated driving and holding devices for the strip and for the winding and unwinding drums supporting the strip are necessary, and the movement of these parts as a whole, places a load on the machine, and, as in the previous case, this mass movement tends to create vibrations throughout the machine which mitigates against its efficiency.

In addition to the extreme accuracy required, the speed of operation is of prime consideration and in practice this speed is, in a great measure, governed by the inertia of the parts to be moved in each cycle of operation. In hitherto proposed machines, as already referred to, the inertia to be overcome is very considerable and the devices for ensuring accuracy in positioning with the various movements of the parts concerned are necessarily somewhat complicated.

It is the chief object of the present invention to provide an improved and highly efficient machine for photographically projecting upon a sensitised surface, in selected spaced relationship, images of successive elements for typographical composition and one which will overcome the aforesaid drawbacks and be capable of fulfilling the necessary requirements as to precision, accuracy and speed of operation.

It is an essential feature of the present invention that a support for a sensitised receiving-element and the lens or lens system are arranged in a fixed focal plane and both remain stationary throughout the letter-by-letter composition of a line of text on the said receiving element and that the projection of the characters from the lens on to the said element is effected by a reflector which, by successive linear movements, projects and determines the position of the projected images along a line on the said focal plane.

In accordance with the present invention the reflector which is arranged between a stationary support for a sensitised receiving element and a stationary projecting lens is provided with two reflecting surfaces at right angles to each other and at 45° to the optical axis of the lens, and the intermittent advances of the reflector are parallel with the focal plane of the lens and the receiving element.

In this arrangement the optical axis is bent by the reflector through two right angles between the lens and a sensitized receiving-element mounted in or on the aforesaid support and in all successive positions of the reflector the focal length is a constant. A character or image projected through the lens from a selectively positioned master or original, falls on to one reflecting surface of the reflector from which it is reflected to the other reflecting surface thereof and thence to a point or focus on a sensitized receiving-element mounted in the said support, the said point being determined by the linear movements of the reflector.

Driving or feeding mechanism is provided for advancing the reflector intermittently for successive character or like projections, in selected spaced relationship on the sensitised receiving-element which, as stated above, remains stationary throughout the composition of a line of matter thereon.

Mechanism is also provided for varying the extent of advance of the reflector relatively to both the stationary lens and to the stationary sensitized element in accordance with the width of the character or image projected or to be projected for each line of matter to be composed on the said sensitized element. Such mechanism may conveniently be in the form of a graduated series of gauges controlled from or by the record-strip, a variable stop, and translating mechanism co-operating therewith.

Likewise mechanism, which determines or varies the extent of each advance of the reflector for the interword or justification spaces for each line of composition, may comprise a record-strip-controlled graduated series of gauges, a translating mechanism and a variable stop operated prior to the projection of the initial or leading character or other symbol in a line of composition.

Mechanisms, also controlled from the record-strip, are provided for respectively returning the reflector to initial position and for advancing the sensitised element ready for the reception of a fresh line of characters or the like after one line of composition has been completed.

The master or original characters of the typographical fount to be used are clear or transparent on a black or opaque background and are preferably assembled on a plate carried in adjustable frames so arranged that, under control of signals in the record-strip, positioning or translating mechanisms selectively adjust the plate to bring any required character over the optical axis of the lens.

A controller or record-strip, suitable for governing the movements of elements or units of the machine, may be one of several known forms. It may be in the form of a perforated strip, in which the perforations control a compressed air or pneumatic system embodied in the machine or it may be furnished with perforations, moveable contact pieces, or other devices which can control the closing of electrical circuits, or set in motion mechanical devices. In the embodiment now to be described the arrangement first referred to is employed.

Referring to the accompanying drawings:

Fig. 3 is a sectional view on the line III—III on Fig. 2.

Fig. 4 is a sectional plan on the line IV—IV on Fig. 3.

Fig. 5 is a sectional plan approximately on the line V—V on Fig. 2.

Fig. 6 is a sectional elevation through the casing containing the sensitised element, taken approximately on the line VI—VI on Fig. 2.

Fig. 6a is a plan showing the mechanism for advancing the sensitised element for each fresh line of composition.

Fig. 7 is a sectional elevation of the controlling mechanism for the sensitised element taken approximately on the line VII—VII on Fig. 5.

Fig. 8 is a section taken on the line VIII—VIII on Fig. 7.

Fig. 9 is a sectional elevation of the driving gripper for the reflector.

Fig. 10 is a side elevation of the gripper looking in the direction of the arrow on Fig. 9.

Fig. 11 is a plan showing the master plate and carrier and the positioning mechanism therefor.

Fig. 12 is an elevation partly in section of the variable stop or mechanism for measuring or determining the extent of each advance of the reflector.

Fig. 13 is a plan view thereof.

Fig. 14 is a detail of the same mechanism taken on the line XIV—XIV on Fig. 12.

Fig. 15 is a diagrammatic view showing the pneumatic system of control and

Fig. 16 shows a portion of a record strip for use with the said system of control.

In the accompanying drawings, A is the reflector, B the lens carrying unit, C the master plate and D is the holder or support for a sensitised sheet or plate.

In the embodiment of the invention, now to be described, the reflector A is in the form of a mirror comprising two reflecting strips or bars $A^1$, $A^2$, which are rigidly fixed in a supporting frame $A^3$ adapted to slide in a guiding frame $A^4$ parallelly with the focal plane of the lens B. These bars $A^1$, $A^2$ are arranged at right angles to each other and at 45° to the optical axis of the lens B (see Figs. 1, 2, 3 and 5).

The reflector and its carrying frame can be comparatively light and thereby reduce the weight to be moved to a minimum and thus also reduce the tendency to vibration due to the weight of moving parts or shocks in starting or arresting such parts. The two mirror strips constituting the reflector may be made of aluminium and the sliding frame in which the reflector is rigidly fixed may also be made of light material.

If the machine is designed say for type up to a maximum size of 18-point then the width of each strip need not exceed ⅜ of an inch.

Figure 1:
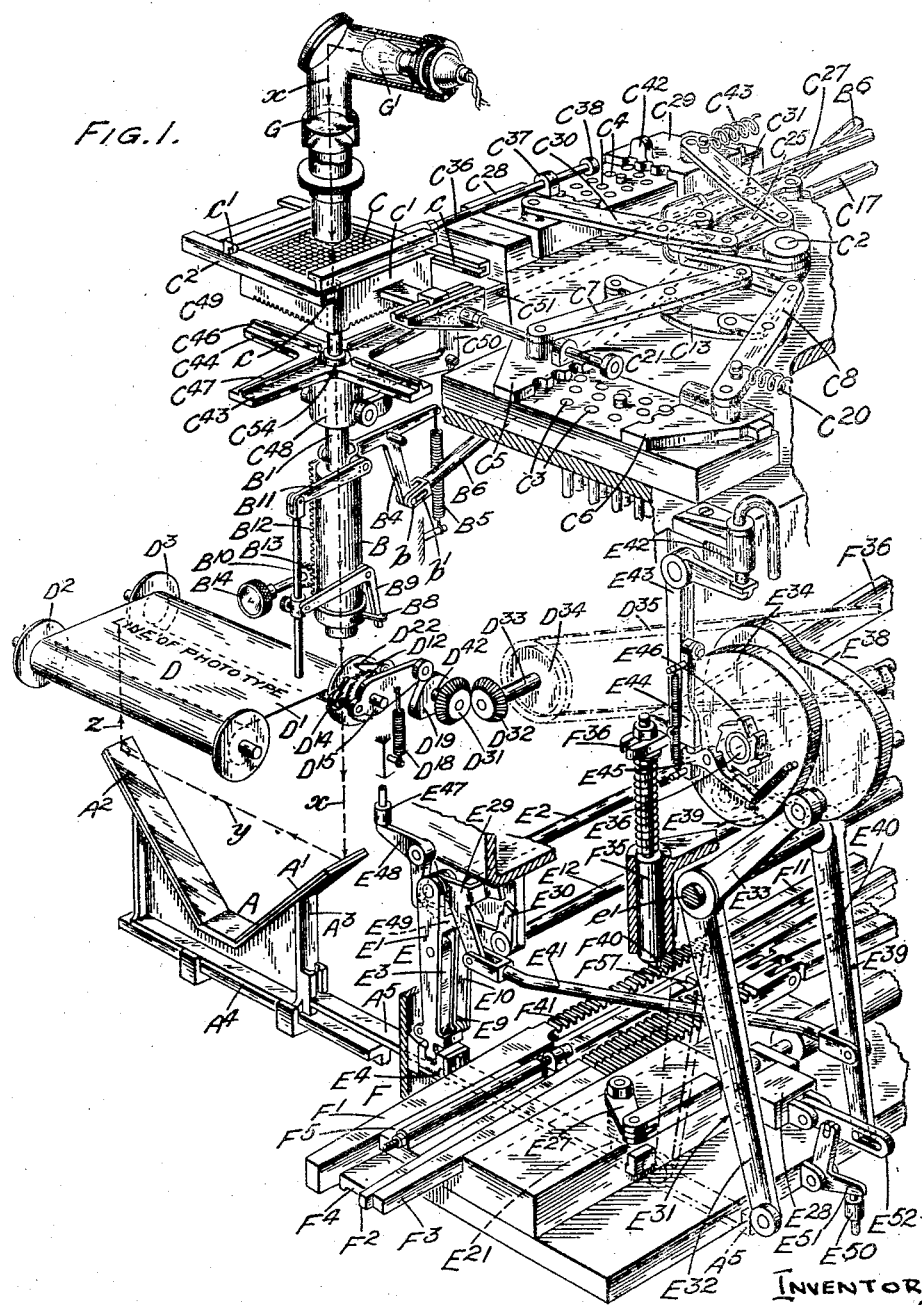
Fig. 1 is a diagrammatic perspective view of a photo-mechanical typographic composing machine embodying the present invention.
Figure 2:
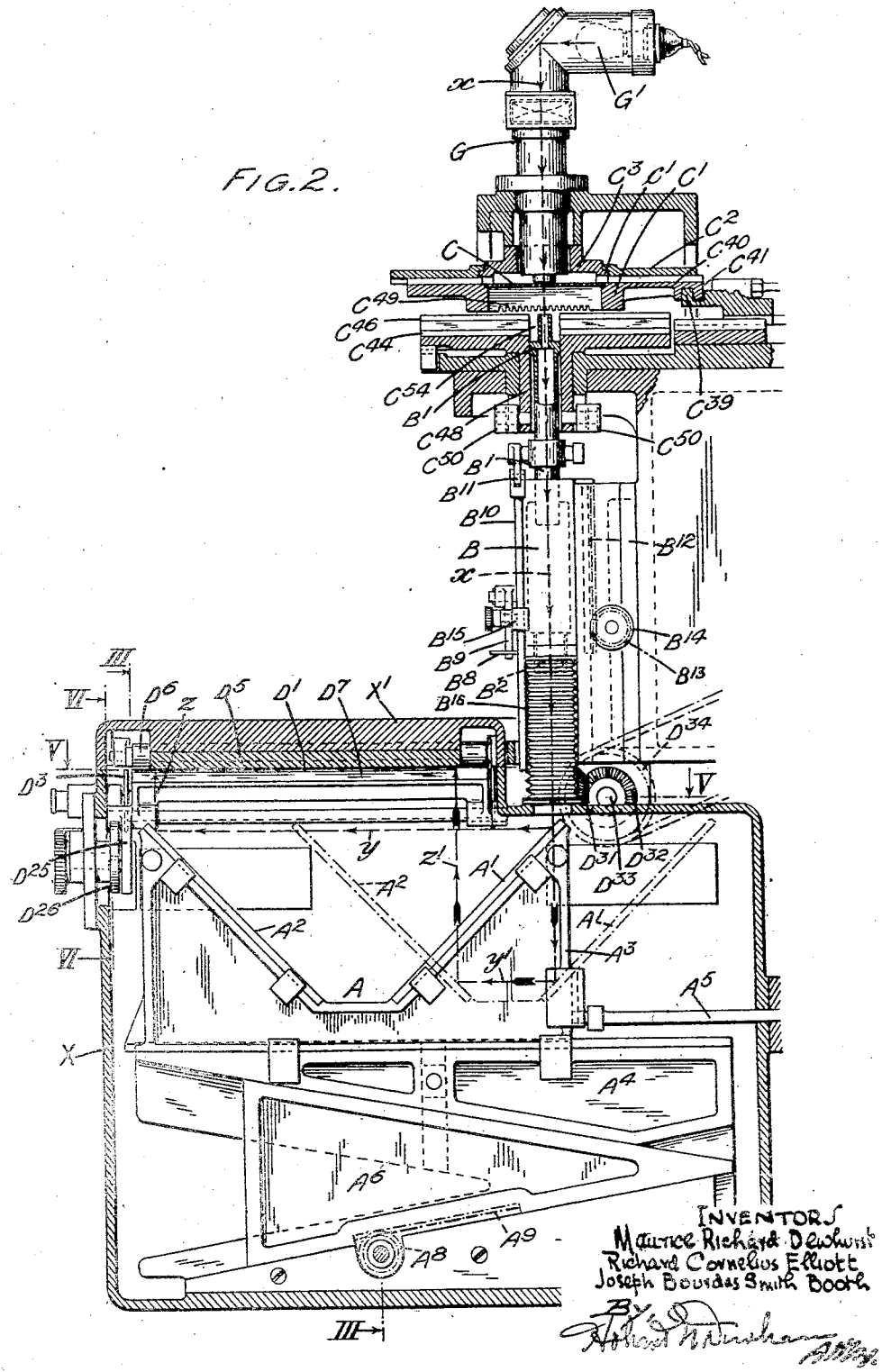
Fig. 2 is a cross sectional elevation showing the more essential features of the invention, namely, the movable reflector or prism, the master plate, the lens, and the holder for the sensitised receiving element.

The lens or lens unit B is arranged between the reflector A and the master plate C (see Figs. 1, 2 and 3) and in such a position that the optical axis of the lens falls just within the upper end of the strip $A^1$ when the reflector is in its initial position (see Fig. 2). An image on the master plate C projected through the lens and along the optical axis $x$ will, in this position, fall on the mirror bar $A^1$ and be reflected along the line $y$ on to the mirror bar $A^2$ and thence along the line $z$ on to a predetermined point at the left-hand side of a sensitised element $D^1$ (see Fig. 2) mounted in the holder D. For each character, symbol or the like in a line of composition, the reflector is advanced and the extent of each of such advance is determined by a selectively positioned variable stop, in accordance with the width of each character or the like, a convenient mechanism for effecting these movements will be described later on.

In each progressive advance of the reflector, the lines of the optical axis $x$, $y$ and $z$ will fall successively on lower points on the members $A^1$, $A^2$ of the reflector until the line of composition has been completed when the final position of the optical axis will be as indicated by the lines and feathered arrows $x$, $y^1$, $z^1$ as indicated in Fig. 2. It is to be noted that the optical axis is of constant length throughout the changing positions of the reflector during the composition of a line, and that the movement of the reflector will in each case be half of the true width apportioned to each character, symbol, or the like in any line of composition.

In the present embodiment, the sensitised sheet element $D^1$ to be employed is in the form of a roll film preferably mounted on an apron or backing carried on delivery and take-up rolls or spools $D^2$, $D^3$ (see Figs. 3 and 5 to 8). Throughout the composition of a line of matter, the sensitised sheet $D^1$ remains stationary while a line of matter, parallel with the axis of the rolls $D^2$, $D^3$ (as indicated in Fig. 1), is composed thereon by the linear advance of the reflector A. The line of text in Fig. 1 is merely to indicate the position since, actually, as will be explained later, the line will be in the order reverse to that shown.

The sensitised element or sheet $D^1$ and its supports $D^2$, $D^3$ are enclosed in a light-excluding casing X. Between the lower end of the tube B and an opening in the cover of the casing X is arranged a bellows $B^{16}$ to permit of the adjustment or initial setting of the lens tube B.

After a character or the like has been photographically projected from the master plate C on to the sheet $D^1$, the reflector A is moved bodily to the right as viewed in Figs. 1 and 2, the movement being in a plane parallel with the surface of the receiving element $D^1$ and the focal plane of the lens. The extent of each movement of the reflector A depends upon the width or unit value of the character or the like projected or of an interword or other blank space and is determined in each instance by an adjustable stop F (see Figs. 1, 2, 5, 12 and 13) which is, or parts of which are, variably and selectively positioned under control of signals in the controlling record-strip, for each character, symbol or the like to be projected.

When all the characters, spaces, points, etc. for a complete line have been projected, the reflector A is returned to initial position for the commencement of a fresh line of composition, by mechanism controlled from signals in the record-strip. During this return movement the sensitised sheet $D^1$ is also moved forward by mechanism controlled from signals in the record-strip, to present a fresh portion of the sensitised surface for the reception of a fresh line of matter and parts of the variable stop F are reset, likewise under control of the record-strip, for the justification of the next line of matter to be composed.

The lens unit, in the present embodiment, comprises a telescopic tube $BB^1$ (see Figs. 1 to 4), the part B of which is stationary and supports the lens and the other part $B^1$, which before a character is projected is movable into contact with the under surface of the master plate C, thus constituting a light-excluding tube through which a selectively positioned character on the master plate is projected through the lens and on to the member $A^1$ of the reflector.

The master plate C bearing the characters, points and other symbols, usually included in a typographic fount, is fixed in a frame $C^1$ which is mounted to slide in one direction in a carrier $C^2$, which in turn is mounted to slide in a bridge $C^3$, at right angles to the movement of the frame $C^1$ in the carrier $C^2$ (see Figs. 1, 2, 3 and 11). Translating mechanism is provided for moving the master plate in these two directions in the same plane to bring the desired character or the like on the master plate into or over the optical axis of the lens and such mechanism is controlled from signals in the record-strip.

The master or character-bearing plate E may be of glass, or other translucent substance having transparent characters arranged in rows and columns on a black or opaque background. Interword spaces and various spaces of fixed dimensions are conveniently represented on the master plate by blank or opaque sections. The frame $C^1$ in which the plate C is mounted, is furnished on two opposite sides with parallel guides $c$ by which it is supported on the carrier $C^2$. This carrier $C^2$ is likewise furnished on two opposite sides with guides $c^1$ supported in a stationary bridge or frame $C^x$. The positioning of any character or symbol on the plate A, in the optical axis of the lens, is effected by selective horizontal movements of the frame $C^1$ in the carrier $C^2$ and by the movement of the latter in its frame $C^x$ in the same plane and at right angles to the movement of the frame $C^1$. In the present embodiment, these movements are effected by two graduated gauges $C^3$, $C^4$ (see Figs. 1 and 11) each comprising a series of pins or stops any one of which can be raised, to act as a gauging stop for the translating mechanisms of the frame $C^1$ and the carrier $C^2$, by signals in the record-strip. The positions denoted by these stops, when operated, are conveyed respectively to the frame $C^1$ and the carrier $C^2$ by their separate translating or positioning mechanisms, each of which comprises a pair of levers carrying jaws which operate with the pins of their respective gauge $C^3$ or $C^4$. The translating mechanism for the frame $C^1$, comprises a pair of jaws $C^5$, $C^5$, which are arranged to reciprocate on a guide bar above the gauge pins $C^3$ and to each of the jaws is pivotally connected the outer end of one of a pair of levers $C^7$, $C^8$, which are connected together at their other ends by a link $C^9$ (see Figs. 1 and 11). The lever $C^7$ is pivotally attached to one end of a link $C^{10}$ the opposite end of which is mounted upon a stationary post $C^{19}$ on the machine frame, and the lever $C^8$ is similarly connected by a link $C^{11}$ to a pin $C^{12}$ carried by a horizontally reciprocating quadrant $C^{13}$ which is fulcrumed at $c^2$. This quadrant receives motion from a pair of twin cams $C^{14}$, $C^{15}$, carried on the main cam shafts Y, Z (see Fig. 1). The cams impart movement to a lever $C^{16}$, the upper end of which is coupled to a driving rod $C^{17}$ which embodies a spring box or coupling $C^{18}$ and the other end of this driving rod is pivoted to the quadrant $C^{13}$ at $c^3$.

Commencing with the jaws open or at starting position as shown in Fig. 1; when the driving rod $C^{17}$ is moved by the cams towards the right, motion will be transmitted through the link $C^{11}$ to the lever $C^8$ which, being restrained by a spring $C^{20}$, turns on the pivot connecting it to the jaw $C^6$ and transmits movement, through the connecting link $C^9$, to the jaw lever $C^7$ which will now turn on its pivot on the link $C^{10}$, and advance the jaw $C^5$ until the latter is arrested by whichever pin of the series $C^3$ is elevated. As soon as the movement of the lever $C^7$ is arrested by the contact of the jaw $C^5$ with an elevated pin, the fulcrum of the system is transferred to the outer end of the lever $C^7$, and this lever becomes the power arm and transmits the continued driving movement of the quadrant, through the coupling link $C^9$ to the jaw lever $C^8$, causing this lever to turn on the pivot of its link $C^{11}$ and advance the pin jaw $C^6$ against the tension of the spring $C^{20}$ until it contacts with the jaw $C^5$. A draw rod $C^{21}$ attached to the frame $C^1$ of the master plate passes through a bearing block $C^{22}$ on the jaw $C^5$ and is furnished with a head or stop $C^{23}$. On the jaw $C^6$ is mounted a stop block $C^{24}$. The frame $C^1$ may be moved by either jaw acting on the head $C^{23}$, depending upon the position of elevated positioning pin of the series $C^3$ relatively to the position in which the draw rod and frame were left by a previously operated pin. When the draw rod head $C^{23}$ is firmly clamped between the jaw blocks $C^{22}$ and $C^{24}$ the frame $C^1$ is in a selected position in one direction.

The draw rod $C^{21}$ is furnished with a channelled cross head $C^{32}$ and an extension $C^{40}$ on the frame $C^1$ is furnished with a nose $C^{41}$ which projects into the said channel. This permits the frame $C^1$, while following the movement of the draw rod $C^{21}$, to be moved in another direction by the carrier $C^2$.

Mechanism, similar to that for moving the frame $C^1$, is provided for moving the carrier $C^2$, in co-operation with the series of gauges $C^4$, in a direction at right angles to the movement of the frame $C^1$. Fulcrumed on the pivot $c^2$ carrying the quadrant $C^{13}$ is a second quadrant $C^{25}$ which receives motion from the cams $C^{14}$, $C^{15}$ already referred to, through the aforesaid lever $C^{16}$. This lever through a spring box $C^{26}$, connected to the spring box $C^{18}$, operates a driving rod $C^{27}$ coupled to the said quadrant $C^{25}$. A pair of jaws $C^{28}$, $C^{29}$, mounted on a bearing block and arranged to slide over the pins of the series $C^4$, have pivoted to them the outer ends of a pair of levers $C^{30}$, $C^{31}$, which are coupled at their other ends by a link $C^{32}$. The lever $C^{30}$ is connected to the quadrant $C^{25}$ by a link $C^{33}$ and the lever $C^{31}$ has connected to it one end of a link $C^{34}$, the other end of which is mounted on a fixed pivot $C^{35}$. A draw bar $C^{36}$ attached to the carrier $C^2$ passes through a bearing block $C^{37}$ on the jaw $C^{28}$ and is furnished with a head $C^{38}$. When the quadrant $C^{25}$ is moved, motion is imparted through link $C^{33}$ to jaw lever $C^{30}$ which, turning on its pivot on the link $C^{32}$ advances the pin jaw $C^{28}$ until it encounters the elevated pin in the series $C^4$ and during this movement the jaw lever $C^{31}$ is restrained by a spring $C^{43}$.

When the jaw $C^{28}$ has been arrested by an elevated pin, motion is transferred to the lever $C^{31}$ since the lever $C^{30}$ turning on its pivot on the jaw $C^{28}$ applies power to jaw-lever $C^{31}$ through the coupling link $C^{32}$. The jaw $C^{29}$ is advanced until it also contacts with the jaw $C^{28}$ and the draw-bar $C^{36}$ of the carrier $C^2$, which has been moved by either jaw, is arrested when the head $C^{38}$ is clamped between the block $C^{37}$ and a block $C^{42}$ on the jaw $C^{29}$, thus adjusting the plate C in its second direction of movement. Thus the combined movements of the frame $C^1$ and carrier $C^2$ bring the required character or symbol on the plate C into the optical axis of the lens or lens system.

Before sets of jaws are returned to initial positions when the movement of the driving lever $C^{16}$ is reversed by the cams $C^{14}$, $C^{15}$, leaving the draw rods $C^{21}$ with the frame $C^1$ and the draw rod $C^{36}$ with the carrier $C^2$ in the positions to which they had been moved and also ready to be picked up and moved in accordance with the positions denoted by the pins in the series $C^3$ and $C^4$ next to be elevated.

When the plate-carrying frame $C^1$ has been selectively positioned, as above described, it is finally accurately adjusted and locked in position, against vibration or accidental movement, by mechanism conveniently operated by a cam, in timed relation with its positioning mechanisms.

In the present embodiment this locking mechanism comprises two crossed locking bars $C^{44}$ and $C^{45}$ (see Figs. 1, 2 and 3) furnished with tapering ribs $C^{46}$ and $C^{47}$ respectively and mounted on a sliding support $C^{48}$. Coupled to the sliding support $C^{48}$ is one end of a bell-crank lever $C^{50}$ the other end of which is connected to a rod or bar $C^{51}$, which in turn is connected to a rocking lever $C^{52}$. This lever $C^{52}$ receives motion from twin cams $C^{53}$ on the main cam shaft Y, Z, and is raised so that the ribs on the aforesaid bars engage between any pair of a series of teeth $C^{49}$ on the four under sides of the carrier $C^1$ and lock it accurately in position.

When the master plate has been positioned and locked as above described, the part $B^1$ of the lens tube B, which extends through a central opening $C^{54}$ in the locking frame $C^{48}$, is raised to bring its upper end into contact with the master plate and surround the positioned or selected character thereon. The movements of the tube $B^1$ are controlled by a pair of cams $B^3$ on the main cam-shafts Y and Z co-operating with a lever $B^4$. A forked arm of the lever $B^4$ is coupled to the tube $B^1$ while a second arm has attached to it a controlling spring $B^5$. A third arm of the lever $B^4$ is provided with pins $b$ which enter slots $b^1$ in a forked end of a rod $B^6$ the other end of which is coupled to one end of a pivoted lever $B^7$ which is operated by the cams $B^3$. These cams are adapted to withdraw the tube $B^1$ from contact with the plate C to allow for the adjustment of the latter and when the rod $B^6$ is moved forward the slots $b^1$ allow the lever to turn on its pivot and the tube is raised into contact with the plate C by the spring $B^5$.

The mechanism which operates the tube $B^1$ is also conveniently employed to operate the lens shutter in timed relationship with the positioning of the plate C. The shutter is furnished with a trigger $B^8$ and is acted upon by one arm of a lever $B^9$ pivoted to the tube B. The other arm of the lever $B^9$ is coupled to a rod $B^{10}$, the upper end of which is pivoted to an arm $B^{11}$ attached to an arm of the lever $B^4$. When the lever $B^4$ is operated by the spring $B^5$ the rod $B^{10}$ is pulled upwards and the lever $B^9$ is rocked to operate the trigger $B^8$ of the lens shutter.

The lens tube B has been described as stationary, but in order that the size of the characters impressed on the sheet $D^1$ may be varied up or down, within short limits, from the actual size of those on the master plate C, provision is made for adjusting this tube. In the present example this adjustment is shown in the form of a rack $B^{12}$ (see Fig. 4) attached to the tube body and a toothed pinion $B^{13}$ provided with an adjusting knob $B^{14}$. The adjustment may be made by means of a micrometer screw, or other form of adjustment capable of working to very fine limits may be employed. To permit of the adjustment being made, the attachment of the trigger operating lever $B^9$ to the rod $B^{10}$ is adjustable by means of a sleeve-fitting $B^{15}$ (see Figs. 2, 3 and 4) and the bellows $B^{16}$ will be extended or collapsed according to the direction of movement of the tube B. The source of illumination may be of any known suitable arrangement. In the arrangement illustrated an electric lamp $G^1$ is mounted in one arm of a kneed tube G and the rays from the lamp are directed on to a reflector $G^2$ and thence down the vertical arm of the tube G on to a portion of the character-bearing plate C as indicated by the line $x$ (see Figs. 1 and 2).

Adjustments of the lens tube by which the size of the characters or the like, impressed on the receiving element $D^1$ may be enlarged or reduced relatively to those on the master plate will be accompanied by a corresponding raising or lowering the reflector relatively to the receiving element. A convenient method of effecting this adjustment comprises a wedge-shaped member $A^6$ arranged to slide between the frame $A^4$ upon which the reflector slides and a base $A^7$ therefor. The faces of the frames $A^4$ and base $A^7$ are tapered to conform to the taper of the member $A^6$. Conveniently the adjustment of the member $A^6$ can be made by a hand-operated pinion $A^8$ gearing with a rack $A^9$ of the member $A^6$ (see Figs. 2 and 3).

After a character or other symbol has been photographed, the controlling record-strip is advanced, as will be described later, and the resetting of the plate C, for the next character, initiated, and the reflector A will afterwards be advanced a step, by its driving gripper E until the latter is arrested by contact with a variable stop F which will be reset also under the control of the record-strip, for the next character in question.

The gripper E (see Figs. 1, 2, 9 and 10) acts upon a draw-bar $A^5$ attached to the carrying frame $A^3$ of the reflector A (see Figs. 1, 2, 5 and 11) and the extent of movement imparted to the reflector is in all cases determined by the adjustable and variable stop F which is interposed in the path of the gripper, and is controlled through translating mechanism by signals in the record-strip, so that it is set for and according to the width or set value apportioned to each character, space, etc. to be projected. This driving gripper E (see Figs. 9 and 10) conveniently comprises a split arm or lever $E^1$, secured at its upper end to a rocker shaft $E^2$. The lower end of the lever $E^1$ enters a slot in a sliding block $E^4$ through an opening in which the draw-bar $A^5$ passes and between the draw-bar and an inclined upper wall of the opening in the block $E^4$ is a sliding wedge $E^5$. Within the lever $E^1$ is pivoted a lever $E^3$ which is forked and slotted at its lower end to embrace pins $e$ on the wedge $E^5$. Normally the wedge $E^5$ is pressed towards the left (as viewed in Fig. 9) by a spring $E^6$, and clamps the draw-bar $A^5$ and the block $E^4$ together, to be advanced as one by the movement of the lever $E^1$ until a nose $E^{53}$ on the block $E^4$ comes against a portion of the variable stop F. The rocker shaft $E^2$, which imparts the driving stroke to the gripper E, obtains its motion from a pair of cams $E^{13}$ mounted on twin shafts Y, Z, which cams engage one end of a bell crank lever $E^{14}$ (see Fig. 1) to transmit movement through a rod $E^{15}$, embodying a spring box, to a crank $E^{16}$ attached to the rocker shaft $E^2$.

After each advance of the reflector A, the wedge $E^5$ is caused to release the draw-bar $A^5$ by a cam $E^7$ mounted on a shaft $E^8$ carried by the arms $E^1$ of the gripper E (see Fig. 9). Connected to the shaft $E^8$ is a short crank $E^9$, to which is attached an operating link $E^{10}$ (see Fig. 10), the upper end of which is connected to one member of a bell-crank lever $E^{11}$ carried on the forward end of a rocker shaft $E^{12}$. The rocker shaft $E^{12}$ is operated by a pair of cams $E^{17}$ on the twin shafts Y, Z, which act upon a bell crank lever $E^{18}$, to transmit motion through a rod $E^{19}$, comprising a spring box, to a crank $E^{20}$ secured to the rear end of a rocker shaft $E^{12}$ (see Fig. 1).

When the draw-bar $A^5$ is released from the gripper E, a clamp $E^{21}$ (see Figs. 1, 2 and 5) engages the bar to hold the reflector against accidental displacement. This clamp is operated from cams $E^{22}$ on the twin shafts Y, Z, which through a bell crank lever $E^{23}$, a link $E^{24}$ and a bell crank lever $E^{25}$, impart motion to a rod $E^{26}$ embodying a spring box and connected to a crank $E^{27}$ on the clamp $E^{21}$ (see Fig. 1).

On the completion of a line of composition, the reflector A is returned to initial position and a convenient mechanism for this purpose comprises a bell crank lever $E^{31}$ fulcrumed on a shaft $e^1$ and so arranged that one arm $E^{32}$ thereof rests in the path of the draw-bar $A^5$ of the reflector and the other arm $E^{33}$ bears against a cam $E^{34}$ (see Figs. 1 and 2). The cam $E^{34}$ is carried by the sleeve $E^{35}$ loosely mounted on a shaft $E^{36}$ which is driven constantly by gearing $E^{37}$ from the cam shaft Z.

During the composition of a line, the shaft $E^{36}$ rotates idly and the sleeve $E^{35}$ and the cam $E^{34}$ remain stationary being locked by a latch $E^{44}$ (see Fig. 1) which engages a pawl $E^{45}$ carried on the face of the cam $E^{34}$.

The return movement of the reflector A is under the control of a signal in the record strip (to be described later) and in this embodiment of the invention, the said signal admits air to either a pair of cylinders $E^{42}$ (see Fig. 15) only one of these cylinders being indicated, in Fig. 1. The pistons of these cylinders act upon one arm of a pivoted bell crank lever $E^{43}$ on the other arm of which lever the latch $E^{44}$ is pivoted. When the lever $E^{43}$ is operated the latch $E^{44}$ is withdrawn and the pawl $E^{45}$ engages a ratchet wheel $E^{46}$ on the end of the shaft $E^{36}$, thus coupling the sleeve $E^{35}$ and shaft $E^{36}$ together. When the shaft $E^{36}$ and cam $E^{34}$ complete one revolution the latch $E^{44}$ has been returned by its spring and engages the pawl $E^{45}$ to disengage it from the ratchet wheel $E^{46}$ and arrest the cam carrying sleeve $E^{35}$. The cam $E^{34}$ has now also returned the lever $E^{41}$ to initial position.

Before the cam $E^{34}$ actuates the return lever $E^{31}$ for the reflector, the clamp $E^{21}$ and the wedge $E^5$ are rendered inoperative, the clamp $E^{21}$ being operated by a second cam $E^{38}$ mounted on the sleeve $E^{35}$ (see Figs. 1 and 2). This cam $E^{38}$ acts upon one arm of a bell-crank lever $E^{39}$, the other arm $E^{40}$ of which is coupled to a link $E^{52}$ attached to a stop block $E^{28}$, which is interposed thereby behind an abutment on the driving rod $E^{26}$ of the clamp $E^{21}$. The arm $E^{40}$ of the aforesaid cam-operated bell-crank lever is also coupled by a link $E^{41}$ to a locking lever $E^{29}$ loosely mounted on the rocker shaft $E^2$ so that when it operates the stop block $E^{28}$ it also rocks the locking lever $E^{29}$ so that it engages one arm $E^{30}$ of the lever $E^{11}$ and holds it in the position in which it prevents the wedge $E^5$ from gripping the draw-bar $A^5$ (see Figs. 1, 9 and 10).

When the reflector has been returned to initial position by the cam $E^{34}$, the cam $E^{38}$, through the lever $E^{40}$, effects the withdrawal of the stop block $E^{28}$ and the locking lever $E^{29}$ for the wedge $E^5$, allowing the gripper E to resume the feeding movements of the reflector.

During the time the reflector A is being returned to initial position, the record-strip will continue to be advanced and, during the first two cycles of the machine, will present successive signals for effecting the setting of the justification gauges $F^2$, $F^3$ for the next line to be photographed. These two cycles may give sufficient time for returning the reflector, but, in order to avoid shock to the parts, several idle or non-productive cycles of the machine may be provided, and in the present example the gearing $E^{37}$ (see Fig. 1) is so contrived as to impart one revolution of the shaft $E^{36}$ to five revolutions of the cam shaft Y. During these three additional revolutions no productive signals will be presented by the record strip.

These idle or non-productive cycles may be produced by the composer of the record-strip inserting successive signals, formed for example by the combination of the two justification signals $s$, $s^1$ together (see Fig. 16). Each of these signals will operate the latch $E^{44}$ but as the pawl $E^{45}$ is travelling with its cam $E^{34}$, this tripping will be non-effective. These three non-productive signals precede the signals for setting the justification wedges and this feature will be referred to later, when describing the pneumatic system and the record-strip.

In certain kinds of composition, it may be necessary to arrest the step-wise advance of the reflector A during a line of composition, without returning it to initial position and mechanism is provided for this purpose.

Conveniently this is effected through signals in the record-strip which effect the movement of one or other of a pair of air pistons $E^{47}$ which operates a spring-controlled trip latch $E^{48}$ (see Figs. 1 and 2). The nose of this latch, when operated, passes under a tail piece $E^{49}$ on the lever $E^{11}$ of the gripper and prevents its responding to its normal driving movement. The same record-strip signal may also operate a piston $E^{50}$ which operates a bell-crank lever $E^{51}$ and through a pin and slot coupling with the link $E^{52}$ effects the operation of the stop block $E^{28}$ for the bar clamp $E^{21}$ (see Figs. 1 and 2).

The actual amount of movement imparted to the reflector A at each step of its advance during composition is determined, as stated above, by the graduated or variable gauge stop F, which is, or members of which are, selectively positioned under control of signals in the record-strip, either in accordance with the setwise dimension apportioned to each character, figure, or other symbol, or, for justification or interword spaces in any given line of composition.

In passing it is to be noted that spaces or blanks of fixed dimensions will be treated in the same manner as characters or symbols, and only variable or interword spaces are treated as hereinafter described. Both kinds of spaces are represented by non-translucent spaces on the master plate C.

In the present embodiment the variable stop F for the reflector A comprises a main or width-denoting wedge $F^1$, two justification wedges $F^2$, $F^3$, a character or like transfer wedge $F^4$ and a space transfer wedge $F^5$. The two latter wedges determine whether an advance of the reflector is to be measured by the wedge $F^1$ alone or by the wedges $F^1$, $F^2$ and $F^3$ together.

These wedges are arranged between the nose $E^{53}$ of the block $E^4$ of the gripper E and a stationary abutment $F^{60}$ (see Figs. 1, 2, 5 and 13) on the machine frame, the two justification wedges $F^2$, $F^3$ being disposed on a step on the abutment $F^{60}$ and between the said abutment and the main wedge $F^1$.

For measuring all characters, the transfer wedge $F^4$ acts between the wedge $F^1$ and the stationary abutment $F^{60}$.

For interword spaces, the enlarged measurement, as denoted by the two justification wedges $F^2$ and $F^3$ is added to the minimum width given to an interword space as denoted by the wedge $F^1$, and therefore when an interword space is to be recorded, the character transfer wedge $F^4$ is rendered inoperative and the space transfer wedge $F^5$ is interposed between the wedges $F^2$ and $F^3$ and the wedge $F^1$. The two justification wedges $F^2$ and $F^3$ are set for a particular line of composition, under control of signals in the record-strip, before the first character of that line is projected. Thus when characters, etc., are being composed the effective movement of the reflector is determined by the wedge $F^1$. When interword spaces are called for, the movement of the reflector is determined by the wedge $F^1$ together with the two justification wedges $F^2$, $F^3$, so that an amount is added to each interword space necessary to expand the line of composition to the length required to ensure justification. The movements of the transfer wedges $F^3$, $F^4$ are controlled from the record-strip and mechanism so controlled for operating the various elements of the variable gauge stop F will now be described.

The width-denoting wedge $F^1$ is operated from a pair of jaws, $F^6$, $F^7$ (see Figs. 1 and 5) which are mounted to reciprocate on a guide bar $F^8$, above a plate through which project a series of record-strip controlled stop or gauge pins $F^9$ similar to those already described for controlling the positioning of the master plate C. These jaws, have rearward extensions $f^6$, $f^7$ between, or in the path of moveemnt of which, projects a head $F^{10}$ on the end of the stem $F^{11}$ of the wedge $F^1$. The jaws $F^6$ has pivoted to it one end of a lever $F^{12}$ which is pivotally connected to one end of a link $F^{13}$, the other end of which is attached to a fixed pivot $F^{14}$. The jaw $F^7$ has pivoted to it one end of a lever $F^{15}$, which is pivotally connected to one end of a link $F^{16}$ which, in turn, is pivoted to an oscillating quadrant $F^{17}$. The free ends of the levers $F^{12}$, $F^{15}$ are coupled by a link $F^{18}$. The quadrant $F^{17}$ is oscillated by vertical shaft $F^{19}$ to which is coupled one end of a layer $F^{20}$ (see Fig. 1), the other end of which is connected to a driving rod $F^{21}$ embodying a spring box $F^{22}$. This driving rod $F^{21}$ is actuated by a lever $F^{23}$ from twin cams $D^{24}$, or the twin cam shafts Y, Z.

When the driving rod $F^{21}$ is moved to the left (see Fig. 1) the quadrant $F^{17}$ is also swung to the left and the lever $F^{15}$, being restrained by a spring $F^{25}$, turns on its pivot on the jaw $F^7$ and through the link $F^{12}$ causes the lever $F^{12}$ to turn on its pivot on the link $F^{13}$, moving the jaw $F^6$ until it contacts with an elevated pin of the series $F^9$ after which the continued movement of the quadrant $F^{17}$ causes the lever $F^{12}$ to turn on its pivot on the jaw $F^6$ and through the link $F^{16}$ cause the lever $F^{15}$ to turns on its pivot on the link $F^{16}$ and advance the jaw $F^7$ against the tension of the spring $F^{25}$ until this jaw $F^7$ contacts with the jaw $F^6$ in which position the head $F^{10}$ on the wedge $F^1$ will be clamped between the jaw extensions $f^6$, $f^7$ at the position denoted by the elevated pin.

The jaws $F^6$ and $F^7$ are returned to initial position by the return movement of the quadrant $F^{17}$ (see Fig. 5) leaving the wedge $F^1$ to be re-set when the jaws are again closed.

The main wedge $F^1$ is locked after each setting by a spring-controlled pin $F^{35}$ (see Figs. 1 and 12) a tooth $F^{40}$ on which engages between teeth $F^{41}$ on the wedge. This pin is coupled to one end of an operating lever $F^{36}$, which is connected through a link $F^{37}$, with a bell crank lever $F^{38}$ receiving motion from cams $F^{39}$ on the twin shafts Y, Z.

In the present embodiment, the wedge $F^1$ for determining the width or space to be allotted to each character or symbol on the master plate is independent of the mechanism for positioning the master plate and therefore the characters or symbols are not restricted in their location on the master plate by their width or unit value. This allows for a wider selection of characters than would be possible if all characters, etc., of a particular unit value had to be placed in the same row on the master plate, it also avoids the necessity of having blanks where there are not sufficient characters of a given unit value in the fount to fill a row completely.

In cases where a limited fount is used and it is considered desirable to arrange the characters in rows according to their unit value, then the wedge $F^1$ could be positioned through suitable mechanism in company with the master plate by the air pins and translating levers co-operating therewith and with the movement of the master plate in the direction widthwise of the characters on the latter.

The jaws $F^6$ and $F^7$ are also employed in the present embodiment for setting, in two otherwise non-productive cycles of the machine, the two justification wedges $F^2$ and $F^3$. Pivoted to the wedge $F^2$ is an extension $F^{26}$ (see Fig. 1) furnished with a boss $F^{27}$ and a similar extension $F^{28}$ furnished with a boss $F^{29}$ is pivoted to the wedge $F^3$. There are separate signals for setting these two wedges. When the first justification signal is presented by the record-strip, air passes momentarily by a conduit to a cylinder $F^{30}$ (see Figs. 1 and 15) beneath the extension $F^{26}$ on the justification wedge $F^2$ and the piston working in this cylinder acts upon one arm of a bell-crank lever $F^{31}$ causing the other end of the arm thereof, which conveniently is furnished with a roller $F^{32}$, to turn the wedge extension $F^{26}$ on its pivot and lift the boss $F^{27}$ thereon into the path of the jaw extensions $f^6$, $f^7$ which, in closing, carry the justification wedge $F^2$ to the position indicated by one or other of the pins of the series $F^9$. In the next cycle of the machine the second transfer wedge $F^3$ is acted upon and set by the admission of air to a cylinder $F^{33}$, the piston in which acts upon a bell-crank lever $F^{34}$ to turn the wedge extension $F^{28}$ and lift the boss $F^{29}$ thereon into position to be engaged and set by the extensions on the jaws $F^6$, $F^7$ in their next closing movement.

When the two justification wedges have been set for a particular line of composition, they are locked aaginst movement until it is required to reset them for another line. The wedge $F^2$ is furnished on its upper surface with a series of teeth $F^{63}$ between any pair of which a tooth on the lower end of a vertically movable and spring-controlled locking bar $F^{69}$ may engage (see Figs. 5 and 12). Similarly the wedge $F^3$ is furnished with teeth $F^{70}$ and a locking bar $F^{71}$. A lever $F^{32}$ fulcrumed on a shaft $f^8$ engages the upper end of the locking bar $F^{69}$ and has pivoted to its outer end a rocking lever $F^{73}$ (see Figs. 12 and 13). This lever passes up through a slot $F^{76}$ in the forward end of the driving lever $F^{36}$ and is furnished with a head or collar $F^{74}$. This rocking lever is held in normal position by a spring $F^{75}$ and the locking bar $F^{69}$ is held in engagement with the teeth on the wedge by a spring $F^{77}$. When the wedge $F^2$ is to be set, air is admitted under control of the record-strip to an air cylinder $F^{78}$ (see Figs. 12 and 13) forcing out a piston $F^{79}$ therein to engage one arm of a pivoted bell-crank lever $F^{80}$ which, in turning on its pivot, engages through its other arm, the rocking lever $F^{73}$, and moves this lever so that its head $F^{74}$ is above the lever $F^{36}$ behind the forward stepped end, when the lever $F^{36}$ is in its lowered position. This lever $F^{36}$, in rising, carries with it the levers $F^{72}$ and $F^{73}$ and locking bar $F^{69}$, leaving the wedge free to respond to the action of its positioning jaws $F^6$ and $F^7$. When the lever $F^{36}$ next descends the locking bar $F^{69}$ re-engages the teeth on the wedge under action of a spring $F^{77}$ and the rocking bar is retracted by its spring $F^{75}$.

The second justification wedge $F^3$ is freed and set in the succeeding cycle of the machine or revolution of the main cam shafts Y, Z. Air is admitted to a cylinder $F^{81}$ (see Figs. 12 and 13) causing a piston $F^{82}$ therein to act on one arm of a bell-crank lever $F^{83}$ to turn on its pivot and engaage a rocking lever $F^{84}$. The upper end of this rocking lever normally rests idly in the slot $F^{85}$ in the forward stepped end of the driving lever $F^{36}$. When the lever $F^{84}$ is rocked a head $F^{86}$ thereon passes above the forward end of the lever $F^{36}$. The lower end of the rocking lever $F^{84}$ is pivoted to one end of a lever $F^{87}$, which is fulcrumed on the shaft $f^8$ and embraces the upper end of the locking bar $F^{71}$. Thus the lever $F^{36}$ in rising raises the locking bar $F^{71}$ out of engagement with teeth $F^{70}$ on the wedge $F^3$ allowing it to respond to the action of the positioning jaw $F^6$, $F^7$. On the next descent of the lever $F^{36}$ the rocking lever is returend by a spring $F^{69}$ and the locking bar re-engages the teeth on the wedge $F^3$ through the action of a spring.

As already stated, the extent of advance of the reflector, and therefore the correct positioning of characters on the sheet $D^1$, is determined for all such characters by the setting of the main wedge $F^1$ and the transfer wedge $F^4$. To effect the justification of a line by expanding the interword spaces therein, it is required that the variation needed, due to the setting of the two justification wedges $F^2$ and $F^3$, be added to the adjustment denoted by the main wedge $F^1$ and therefore the transfer wedge $F^4$ must be moved out of operative position and the transfer wedge $F^5$ be brought into action between the main wedge $F^1$ and the justification wedges $F^2$ and $F^3$.

The transfer wedges $F^4$ and $F^5$ are reciprocated horizontally respectively through rods $F^{42}$ and $F^{43}$ lying above each other and each pivotally connected to the rear ends of its respective wedge (see Fig. 1). To the rear end of the rod $F^{42}$ is pivotally attached one end of an actuating lever $F^{44}$, the opposite end of which is loosely mounted on a cross shaft $Y^1$ through a compression link or spring box $F^{45}$. The rear end of the rod $F^{43}$ is connected to one end of a lever $F^{46}$ the opposite end of which is coupled by a link $F^{47}$ to the lever $F^{44}$ at a point between its ends. A main driving lever $F^{48}$ is connected by a link $F^{49}$ to the lever $F^{46}$ and is also coupled through a link $F^{50}$ with one arm of a bell-crank lever $F^{51}$ the other arm of which is acted upon by cams $F^{52}$ on the main cam shafts $Y$, $Z$. With this arrangement either end of the lever $F^{46}$ may become the fulcrum and accordingly either the wedge $F^4$ or $F^5$ may be rendered inoperative as required. Either wedge may be moved by the action of the cams $F^{52}$ and either may be locked temporarily in its inoperative position by a vertically reciprocating locking bar $F^{54}$ through an opening $F^{56}$ in the lower end of which the two rods $F^{42}$, $F^{43}$ attached to the wedges $F^4$ and $F^5$ pass (see Figs. 12, 13 and 14). Normally this bar $F^{54}$ is retained in its lower position by a spring $F^{55}$ in which position the upper wall of the opening $F^{56}$ engages a notch $F^{57}$ in the rod $F^{52}$ and locks the upper or space transfer wedge $F^5$ in its outer or inoperative position, so that the cams $F^{52}$ operate through the aforesaid link and lever system to actuate the character transfer wedge $F^4$. Under these conditions, the wedge $F^4$ is moved to and fro in each cycle of the machine and is in its operative position each time the main wedge $F^1$ is positioned and locked. When interword or justification spaces are to be produced then the locking bar $F^{54}$ is raised against the resistance of the spring $F^{55}$ and the lower wall of the opening in the bar engages a notch $F^{58}$ in the under surface of the rod $F^{43}$ attached to the wedge $F^4$ when the latter is in its inoperative position and frees the wedge $F^5$, which now responds to the action, through the aforesaid lever system, of the cams $F^{52}$, and is thereby moved into operative position between the wedge $F^1$ and the wedges $F^2$, $F^3$. This change lasts during one cycle of the machine and to effect the operation of the locking bar $F^{54}$ under control of a signal in the record strip, (which signal is part of that for an interword space), one arm of a two-armed lever $F^{59}$ (see Fig. 12) loosely mounted on a shaft $f^0$ embraces the bar $F^{54}$ under a collar $F^{61}$ thereon. The other arm of the lever $F^{59}$ has pivoted to its free end a vertical rocking bar $F^{62}$, which carries a head or nut $F^{63}$ at its upper end. The upper end of the bar $F^{62}$ normally rests idly in a slot in the forward stepped end of the driving lever $F^{36}$.

When the space transfer wedge $F^5$ is to be brought into operation, a component of the air signal for an interword space raises a piston in a cylinder $F^{65}$ (see Figs. 12 and 13) which acts upon one arm of a bell-crank lever $F^{66}$ causing the other arm of the latter to turn the rod $F^{62}$ on its pivot against the tension of a retaining spring $F^{67}$. This movement is timed to take place when the driving lever $F^{36}$ is in its lowered position, so that the rod $F^{62}$ swings over, the head $F^{63}$ thereon passes above the upper surface of the lever $F^{36}$ behind the stepped portion and is raised with the latter in its upward movement, thus effecting the actuation of the locking bar $F^{54}$. When the lever $F^{36}$ next descends the rod $F^{62}$ is withdrawn by its spring $F^{67}$, thus allowing the spring $F^{55}$ to return the locking bar $F^{54}$ to normal or character-producing position.

The sensitised element on to which the characters are projected by the member $A^2$ of the reflector is, according to the present embodiment of the invention, in the form of a sheet film $D^1$, which may be conveniently on a backing supported and carried by a delivery spool $D^2$ and a take-up spool $D^3$ the ends of which are mounted in bearings within a light-excluding casing $X$ (see Figs. 1, 2, 3, 5, 6, 7 and 8). The film is led from the delivery spool $D^2$, between an idle roller $D^{32}$ and a presser bar $D^4$, then beneath a stationary bar $D^5$ and finally between a presser roller $D^6$ and a pivoted arcuate plate $D^7$, to the take-up spool $D^3$.

During the composition of a line of matter, the portion of the stationary film $D^1$ to receive the line of characters etc. is maintained in tension and is flattened against the bar $D^5$ by the gripping elements $D^{30}$, $D^4$, $D^6$ and $D^7$ (see Figs. 3 and 6). The presser roller $D^6$ is mounted between pivoted arms $D^8$ carried on a cross shaft $D^{43}$ and is normally held against the film and backing by springs $D^9$ (see Figs. 5 and 6$^a$) and the presser bar $D^4$ is similarly supported at its ends by arms $D^{10}$ carried by a cross shaft $D^{44}$, and is normally held against the film and its backing by springs $D^{11}$.

The take-up spool $D^3$ is supported at each end on spring-controlled pins $D^{37}$ which are axially withdrawable.

When a line of composition has been completed the take-up spool $D^3$ is rotated by a pawl and ratchet wheel drive to bring a fresh portion of film in front of the bar $D^5$ and in line with the reflector member $A^2$.

Loosely mounted on a sleeve $D^{13}$ surrounding the pin $D^{37}$ at one end of the take-up spool $D^3$, is a ratchet wheel $D^{12}$ and on the face of this wheel are a series of radial slots $D^{48}$ (see Fig. 7) into one or other of which a pin $D^{47}$ in the end of the spool $D^3$ enters and conveys the drive of the ratchet wheel thereto. A sleeve $D^{45}$ is loosely mounted on the sleeve $D^{13}$ is furnished with a tooth quadrant $D^{15}$ and a driving pawl $D^{14}$, which engages the ratchet wheel $D^{12}$. The teeth of the quadrant $D^{15}$ mesh constantly with a rack $D^{16}$ on a plunger $D^{17}$ mounted to slide in bearings on the casing $X$ (see Fig. 7).

Within the plunger is arranged a spring $D^{18}$ one end of which is attached to the said plunger whilst the other end is anchored to a fixed pin $d$ on the casing.

The rack carrying-plunger $D^{17}$ is operated from a cam $D^{19}$ carried on a shaft $D^{42}$ which, in rotating, engages a roller $D^{20a}$ on a pivoted lever $D^{20}$ which is coupled at its free end to the plunger cylinder $D^{17}$ by a pin arranged to work in a slot in a link $D^{21}$ coupled to plunger $D^{17}$. When the cam $D^{19}$ is operated, motion is transmitted to the quadrant $D^{15}$ and the driving pawl $D^{14}$ rides over the teeth of the ratchet wheel $D^{12}$, the latter being restrained by a holding pawl $D^{22}$, and the spring $D^{18}$ is tensioned. When the lever $D^{20}$ is freed from the cam $D^{19}$, the spring $D^{18}$ returns the plunger $D^{17}$, which imparts to the quadrant $D^{15}$ and the ratchet wheel $D^{12}$ the actual drive for the spool $D^3$. As the tendency will be to impart a driving stroke of constant length, a gauging device is employed to compensate for the constantly varying diameter of the take-up roll due to the accumulation of film thereon. When the spring $D^{18}$ is free to act, as above described, the presser bar $D^4$ (see Figs. 3, 6 and 6a) is raised to release the film by a cam $D^{27}$ which acts upon a roller on one end of a pivoted lever $D^{28}$, the other end of which raises a lever $D^{24}$ mounted on the shaft $D^{44}$ carrying the presser bar $D^4$. When this presser bar has been so raised, the film is drawn forward on to the take-up roller by the spring $D^{18}$. The roller $D^6$ pressing the film against the surface of the arcuate plate $D^7$ causes the latter to move forward in company with the film until the arm $D^{25}$ of the said plate encounters an adjustable gauge stop $D^{26}$ (see Fig. 6), which acting against any over-tension in the spring $D^{18}$, limits the precise movement of the film, and ensures that the linear movement of the film shall be constant. When the feed movement is complete, the cam $D^{27}$ allows the presser bar $D^4$ to return and the film is held against further movement by the bar $D^4$ and roller $D^{30}$. When this has taken place another cam $D^{38}$ mounted coaxially with the cam $D^{27}$ acts upon one end of a lever $D^{23}$ to rotate the shaft $D^{43}$ and raise the presser roller $D^6$. This results in the arcuate plate $D^7$ returning under gravity to initial position in which the arm $D^{25}$ thereof comes against a zero stop $D^{29}$.

The distance between the lines of any piece of composition may be varied, by adjustment of the gauge stop $D^{26}$, which is conveniently in the form of a turnable snail cam.

This feed movement of the film $D^1$ is arranged to take place during the time the reflector A is being returned to initial position and the shaft $D^{42}$ carrying the cams $D^{19}$, $D^{38}$ and $D^{27}$ may derive motion from the mechanism controlling the return of the reflector. For this purpose there is mounted on the outer end of the shaft $D^{42}$ a bevel wheel $D^{31}$ which gears with a similar wheel $D^{32}$ on a short shaft $D^{33}$ mounted in a bracket on the casing X (see Figs. 1 and 5). On the outer end of this shaft is fixed a sprocket wheel $D^{34}$ coupled by a chain $D^{35}$ to a sprocket $D^{36}$ on the sleeve $E^{35}$ carrying the reflector controlling cams $E^{34}$ and $E^{38}$.

When the film is all on the take-up spool, it can be removed by the withdrawal of the sliding pins $D^{37}$. The delivery spool is likewise mounted on slidable pins $D^{37}$.

The driving elements for the film are shown in Fig. 1 in a somewhat conventional or diagrammatic manner, the equivalents where possible being indicated by the same reference letters as used for the equivalent parts in other figures of the drawings.

In place of a sensitised film of page size mounted upon delivery and take-up spools, a film appropriate for a page or column of composition or a series of lines one beneath the other, may be temporarily mounted on a solid plate, in which case a toothed wheel may be mounted on the shaft of the ratchet wheel and gear with a rack on the said plate. In this case the holding devices for the film may be dispensed with, and a locking device provided for preventing accidental movement of the plate during the composition of a line of matter.

With such an arrangement the casing in which the sensitised sheet is enclosed would be lengthened to allow the plate to be moved the full length of the sheet employed.

Should it be desired to compose the matter on an intermediate element, in the form of a strip on which the lines are composed end to end instead of page-wise as above described, then the delivery and take-up rolls will be arranged at right angles to those shown and described, and the extent of feed movement given to the film at the end of a line of composition would be varied so that sufficient blank spaces would be provided between the end of one line and the commencement of another.

There remains to be described the controlling record-strip and the pneumatic system by which the signals in the record-strip are conveyed to the desired stations to operate, or control the operation of, parts or units already described.

In passing, it is to be stated that the preparation of the record-strip is not part of the present invention and such strips can be prepared or composed on machines already known for preparing record-strips for single-type casting and composing machines. These machines may be divided into two classes; in one class, the maximum number of components in each normal signal will be three, one component for each of the two series of gauges controlling the positioning of the master plate and a third for the measuring gauge for the reflector. In the other class of machines, in order to reduce the width of the record-strip, each complete signal formed therein may comprise two, or more components for each of the aforesaid series of gauges, in which case, certain of the additional components may be employed to operate switch or diverting valves, situated between a ported air-bar H (see Fig. 16), over which the record-strip R is fed, and a distributing block $H^1$ from which pipes lead the various streams of air to their operative points or stations, and these valves act to divert streams of air from their normal station to some other one. These compound signals can reduce the actual number of punches employed to punch the holes in the strip and provide all the required signal components.

In the present embodiment of the invention, for the sake of simplicity of description, a record-strip is shown prepared according to the first mentioned method.

It is necessary also to state that this record-strip is delivered to the photo-composing machine in the reverse order of composition, so that, in the succession of events the justification adjustments for a line, actually formed in the record-strip after the signals for a complete line have been produced, will be first presented to the bar H, then the characters and spaces in the said line in inverse order of composition will be successively presented until the last character for the line has been photographed, such last photographed character being actually the first character in the line for reading purposes.

In Fig. 16 there is shown a short piece of record-strip R with typical signals employed. From the ports comprising three groups 1, 2 and 3, in the air-bar H, air is led by conduits to a distributing block $H^1$ (see Fig. 15) from which separate series pipes from groups 1 and 2 convey air to each pin in the series $C^3$, $C^4$ controlling the selective positioning of the master plate C, and from the group 3 to the pins in the series $F^9$ controlling the positioning of the main wedge or gauge stop $F^1$ and the supplementary gauge stops $F^2$ and $F^3$. In group 3, in addition to the ports for controlling the positioning of wedges or gauge stops $F^1$, $F^2$ and $F^3$, there are four other ports $H^2$, $H^3$, $H^4$ and $H^5$.

The port $H^2$ is opened to the air supply by the perforation $s$ in the record-strip R, which is a component of the first justification signal, and allows air to travel by the conduit S to the cylinder $F^{30}$ to raise the extension $F^{26}$ of the justification wedge $F^2$, so that the positioning jaws $F^6$, $F^7$ acting on the pins of the positioning gauge $F^9$ will set this wedge for a particular line of composition. A branch $S^2$ from the pipe S leads to the cylinder $F^{78}$ causing the level $F^{60}$ to unlock the wedge $F^2$ prior to its being set. Another branch $S^4$ of the pipe S leads to one of the cylinders $E^{42}$ to cause the lever $E^{43}$ in certain circumstances, to inaugurate the mechanism for returning the reflector A to initial position and the feeding forward of the light-sensitive element $D^1$, and a further branch pipe $S^8$ of the pipe S leads to one of the cylinders $E^{47}$ to cause the lever $E^{48}$ to render inoperate the wedge $E^5$ of the gripper E. Still another branch $S^6$ of the pipe S leads to one of the cylinders $B^{17}$ to cause a stop $B^{18}$ to act on the lever $B^{11}$ to prevent the operation of the shutter (see Fig. 15). Similarly the port $H^3$ when opened to the air supply by the perforation $s^1$, which is a component of the second justification signal in the record-strip, allows air to pass by the pipe $S^1$ to the cylinder $F^{33}$ to raise the extension $F^{28}$ of the justification wedge $F^3$ so that the latter can be set for a particular line by the jaw levers acting in co-operation with an elevated pin of the series $F^9$. Branches $S^3$, $S^5$, $S^7$ and $S^9$ lead from the pipe $S^1$ to the cylinders $F^{31}$, $E^{42}$, $B^{17}$ and $E^{47}$ respectively to effect operations as already described with reference to the pipe S.

An additional pipe $S^{10}$ leads from the pipe $S^1$ to the cylinder $E^{50}$ causing the lever $E^{51}$ to act on the clamp $E^{21}$. The port $H^4$ in the group 3 is controlled by a perforation $s^8$ which is a component of the signal for an interword or justification space and controls the admission of air to a pipe $S^{11}$ leading to the cylinder $F^{65}$ which, as already described, renders the measurements denoted by the wedges $F^2$, $F^3$ effective on the advance of the reflector.

The remaining port $H^5$ in group 3 is controlled by a perforation $S^{10}$ in the record-strip and leads to a pipe $S^{40}$ to admit air to the cylinder J controlling the shifting of a driving belt or a clutch for the main driving shaft of the machine.

Before the machine is started, the leading signal in the record-strip should be placed over the ports in the air bar H. In the example shown the first four signals $s$, $s^1$ represent the two justification signals for a particular line formed together and the fifth signal $S^1$ is the second justification signal alone for the same line.

In operation, each of these four signals $s$, $s^1$ will be accompanied by a perforation belonging to group 3 to determine the position to which the wedges $F^2$, $F^3$ will be moved. Both signals presented together, as shown, will shift the two wedges $F^2$, $F^3$ to the same place and the composer of the record-strip will choose a signal indicating the correct position for the wedge $F^2$. The fifth signal $s^1$ alone will result in the second wedge $F^3$ being correctly positioned which position for the line in question will be indicated by any perforation (not shown) belonging to group 3. These five signals will, in addition to setting the justification wedges, lock out the various devices as already described.

Another function of the first combined signal $s$, $s^1$ is to set in motion the mechanism for returning the reflector to initial position and feeding forward the light-sensitive element $D^1$. The pistons in the cylinders $E^{42}$ act upon an arm of the trip lever $E^{43}$. This lever $E^{43}$ will be acted upon by each successive presentation of the combined signal $s$, $s^1$ but since by the first presentation the pawl $E^{45}$ has been carried away by the cam, this and the succeeding presentations of the signals S, $S^1$ are non-effective on the restoring mechanism since the last signals $S^1$ alone of the group is given before the pawl is back again in position to be engaged by the latch $E^{44}$.

After the justification wedges have been set for any particular line of composition, the next signal to be presented is a character one comprising 3 perforations $s^2$, $s^3$, $s^4$ one operative on each of the three series of gauge pins $C^3$, $C^4$ and $F^9$. The first word W has four characters and then comes an interword space $W^1$, which is represented by four perforations, $s^5$, $s^6$, $s^7$ being one for each of the three gauges $C^3$, $C^4$ and $F^9$ and an additional one $s^8$ to operate cylinder $F^{65}$ of the transfer wedge mechanism. This is followed by another word W of four characters, again an interword space $W^1$, a word W of three characters, an interword space $W^1$, and finally a word W of three characters.

The five signals $s$, $s^1$ above referred to will precede every line in a piece of composition, if as already stated the return of the reflector A to initial position occupies five cycles of the machine including two cycles during which the wedges $F^2$, $F^3$ are set for a given line. Should it be deemed practical to return the reflector to initial position, say during two cycles, then only the two justification signals, $s$, $s^1$ successively presented, would be necessary and the gearing between the cam shaft and the shaft $E^{36}$ may be modified accordingly.

Assuming that the line is the last in a piece of composition then the signals $s^9$, $s^{10}$ shown at the bottom of the sample record-strip would be operated. One component $s^9$ of each of these signals is a justification signal which controls the aforesaid locking out devices, each time it is operated, and the other component $s^{10}$ is a stop signal which controls the supply of air to a cylinder J, the piston in which controls the operation of a trigger $J^1$. This trigger engages a collar or a spring-controlled rod $J^2$ and on being released, this rod operates under its spring to move the belt drive from a fixed pulley to a loose pulley, or disengage a clutch on the driving shaft of the machine.

What we claim is:

1. In a photo-mechanical typographical composing machine, the combination of, a projection lens, an image-bearing master plate, means controllable by a record-strip for selectively moving the master plate relatively to the focal axis of the lens, a stationary support for a light-sensitive element at a fixed focal plane, a reflector arranged between the said lens and said focal plane, and means controllable by a record-strip for imparting successive linear movements to the reflector relatively to the axis of the said lens and focal plane and maintaining a constant focal length.

2. In a photo-mechanical typographical composing machine, the combination of, a projection lens, a master plate having translucent images, translating mechanism for moving the master plate relatively to the focal axis of the lens, graduated gauges selectively controlling the movements of the translating mechanism, a stationary support for a light-sensitive element at a fixed focal plane, a reflector arranged between the said lens and the said focal plane, mechanism for imparting successive linear movements to the reflector along a line parallel with the said focal plane, a variable stop for the reflector and a graduated series of gauges controlling the positioning of the variable stop.

3. In a photo-mechanical typographical composing machine the combination of, a projection lens, an image-bearing master plate, mechanically operated translating mechanisms for moving the master plate in two directions in the same plane, graduated gauges controllable from a record-strip for selectively governing the movements of each translating mechanism, a stationary support for a light-sensitive element mounted on a fixed focal plane, a reflector arranged between the said lens and said focal plane, mechanism for imparting successive linear movements to the reflector along a line parallel with the said lens and the said focal plane, a variable stop for the reflector and a graduated series of gauges controllable from a record-strip for selectively positioning the variable stop.

4. In a photo-mechanical typographical composing machine, the combination of, a stationary lens, a stationary support for a light-sensitive element at a fixed focal plane, an image-bearing master plate, means for selectively moving the master plate in either or both of two directions to bring different portions of it into alinement with the optical axis, a reflector arranged between the said lens and the said focal plane of the support and having two reflecting surfaces at right angles to one another and at 45° to the optical axis of the lens and means for imparting a multiplicity of distinct, successive linear movements in the same direction to the reflector parallel to the focal plane of the said lens.

5. In a photo-mechanical typographical composing machine, the combination of, a stationary lens, a stationary support for a light-sensitive element, a reflector arranged between the lens and the stationary carrier and comprising two reflecting surfaces at right angles to one another and at 45° to the optical axis of the lens, mechanism for imparting successive linear movements to the reflector parallel with the focal plane of the lens and the said support a variable stop and means controlled by said stop for controlling the extent of each of said movements of the reflector.

6. In a photo-mechanical typographical composing machine, the combination of, a stationary lens, a stationary support for a light-sensitive element, a reflector bodily movable parallel with the plane of the support and the focal-plane of the lens and comprising two reflecting surfaces at right angles to one another and at 45° to the focal plane of the lens, translating mechanism for imparting successive linear movements to the reflector, a variable gauge-stop for determining the extent of each movement of the reflector, and a series of gauges controllable from a record-strip for selectively setting the variable gauge-stop for each movement of the reflector.

7. In a photo-mechanical typographical composing machine, the combination of, a stationary support for a light-sensitive element at a fixed focal plane, a stationary lens, an image-bearing master plate, a selective translating mechanism for moving the master plate in relation to the focal axis of the lens, a reflector arranged between the said lens and the said support, means for imparting successive linear movements to the reflector, a variable gauge stop for the reflector comprising independently adjustable members, selective means for moving a member of the said stop for each image projected, and selective means for moving members of the stop for each line of composition.

8. In a photo-mechanical typographical composing machine, the combination of, a stationary lens, a support for a sensitised element at a fixed focal plane, an image-bearing master plate, selective mechanism for moving the master plate in relation to the focal axis of the lens, a reflector arranged between the said lens and the said focal plane, a feeding device for advancing the reflector intermittently, a variable gauge stop for the reflector comprising main and supplementary members, graduated gauges controllable from a record-strip for setting the main gauge for each image projected, and also the supplementary gauge for interword spaces for each line of composition.

9. In a photo-mechanical typographical composing machine, the combination of, a stationary lens, a support for a sensitised element at a fixed focal plane, a reflector, a variable gauge-stop therefor, a pair of mechanically operated jaw-carrying levers, a graduated series of gauges controllable from a record-strip to cooperate with said levers for setting members of the variable gauge-stop as required for each image-projected and also for the justification of each line of composition.

10. In a photo-mechanical typographical composing machine, the combination of, a stationary lens, a stationary support for a sensitised element, a reflector, mechanism for imparting successive linear movements to the reflector parallel with the plane of the said support and the focal plane of the said lens and maintaining a constant focal length throughout, a normal and an abnormal variable gauge-stop for the reflector, actuating mechanism for shifting the normal gauge-stop for each image projected and the abnormal gauge-stop for justifying or interword spaces for each line of composition, and a graduated series of record-strip-controlled gauges cooperating with the said actuating mechanism.

11. In a photo-mechanical typographical composing machine, the combination of, a stationary projection lens, a stationary support for a light-sensitive element at a fixed focal plane, a reflector arranged between the said lens and the said focal plane, means for imparting successive linear movements to the reflector in a plane parallel with the focal plane of the lens, a variable gauge-stop for the reflector comprising main and supplementary members, actuating mechanism including a graduated series of gauges for adjusting the main member of the variable gauge-stop for each image projected and the supplementary member thereof for each line of composition and mechanism controllable from a record-strip for rendering the supplementary gauge-stop operative and inoperative on the reflector.

12. In a photo-mechanical typographical composing machine, the combination of, a stationary projecting lens, a stationary support for a sensitised element, a reflector arranged between the said lens and the said support and having reflecting surfaces at right angles to one another and at 45° to the optical axis of the lens, mechanism for imparting successive linear movements to the reflector along a line parallel with the focal plane of the lens and of the said support, a master plate bearing translucent images, and recordstrip-controlled mechanism for selectively moving the master plate to position any symbol thereon in the optical axis of the lens.

13. In a record-strip-controlled photo-mechanical typographical composing machine, the combination of a projection lens, a stationary support for a light-sensitive element, a reflector arranged between the said lens and the said support, mechanism for imparting successive linear movements to the reflector, a variable gauge-stop for the reflector, a selectively adjustable master plate, two graduated series of gauges each controllable from a record-strip, translating mechanism coupled with the master plate and acting on individual gauges of each series to move the master plate in two directions in one plane and bring a selected character or the like on the said master plate into alignment with the focal axis of the lens, a separate graduated series of gauges controllable from a record-strip and translating mechanism operative upon the individual gauges of the series to adjust the variable gauge-stop for the reflector.

14. In a photo-mechanical typographical composing machine, the combination of, an image-bearing master plate, mechanism for selectively positioning the master plate, a stationary support for a light-sensitive element, a reflector arranged between the master plate and the said support, mechanism for imparting successive linear movements to the reflector, mechanism for locking the master plate, a projection lens, a supporting tube for the lens arranged between the reflector and the master plate, and mechanism for bringing a portion of the lens-carrying tube into contact with the master plate.

15. A photomechanical typographical composing machine comprising in combination, a stationary lens, stationary means for supporting a light-sensitive element throughout a fixed focal plane, said focal plane comprising an area adapted to comprise a composed line of type, reflecting means movably mounted between said lens and said plane and capacitated automatically to provide an optical axis of fixed length in the various positions of said means, said means further being capacitated to reflect light from said lens to a different point in said focal plane for each position of said means, the limits of movement of said means corresponding substantially to the limits of said area.

16. A photomechanical typographical composing machine comprising in combination, a stationary lens, stationary means for supporting a light-sensitive element throughout a fixed focal plane, said focal plane comprising an area adapted to comprise a composed line of type, reflecting means movably mounted between said lens and said plane and capacitated automatically to provide an optical axis of fixed length in the various positions of said means, said means further being capacitated to reflect light from said lens to a different point in said focal plane for each position of said means, said means further being capacitated to reflect light to any point within said area.

17. A photomechanical typographical composing machine comprising in combination, a stationary lens, stationary means for supporting a light-sensitive element throughout a fixed focal plane, said focal plane comprising an area adapted to comprise a composed line of type, reflecting means movably mounted between said lens and said plane and capacitated automatically to provide an optical axis of fixed length in the various positions of said means, said means further being capacitated to reflect light from said lens to a different point in said focal plane for each position of said means, said reflecting means comprising two mirrors in fixed perpendicular relation to each other and mounted for sliding linear movement parallel to said focal plane.

18. A photomechanical typographical composing machine comprising in combination, a stationary lens, stationary means for supporting a light-sensitive element throughout a fixed focal plane, said focal plane comprising an area adapted to comprise a composed line of type, reflecting means movably mounted between said lens and said plane and capacitated automatically to provide an optical axis of fixed length in the various positions of said means, said means further being capacitated to reflect light from said lens to a different point in said focal plane for each position of said means, said reflecting means comprising two mirrors in fixed perpendicular relation to each other and mounted for sliding linear movement parallel to said focal plane and means for sliding said mirrors in distinct successive steps in the same direction.

19. A photomechanical typographical composing machine comprising in combination, a stationary lens, stationary means for supporting a light-sensitive element throughout a fixed focal plane, said focal plane comprising an area adapted to comprise a composed line of type, reflecting means movably mounted between said lens and said plane and capacitated automatically to provide an optical axis of fixed length in the various positions of said means, said means further being capacitated to reflect light from said lens to a different point in said focal plane for each position of said means, said reflecting means comprising two mirrors in fixed perpendicular relation to each other and mounted for sliding linear movement parallel to said focal plane and means for sliding said mirrors in distinct successive steps of selectively variable length and in the same direction.

20. A photomechanical typographical composing machine comprising in combination, a stationary lens, stationary means for supporting a light-sensitive element throughout a fixed focal plane, said focal plane comprising an area adapted to comprise a composed line of type, reflecting means movably mounted between said lens and said plane and capacitated automatically to provide an optical axis of fixed length in the various positions of said means, said means further being capacitated to reflect light from said lens to a different point in said focal plane for each position of said means, said reflecting means comprising two mirrors in fixed perpendicular relation to each other and mounted for sliding linear movement parallel to said focal plane and means for sliding said mirrors in distinct successive steps in the same direction, said steps comprising lineal distances adapted variably to space images reflected on said focal plane to form a composed and justified line of type.

RICHARD C. ELLIOTT.
MAURICE R. DEWHURST.
JOSEPH B. S. BOOTH.